United States Patent [19]

Hamada

[11] 3,882,400

[45] May 6, 1975

[54] BROADCAST RECEIVER

[75] Inventor: Osamu Hamada, Tokyo, Japan

[73] Assignee: Sony Corporation, Tokyo, Japan

[22] Filed: Jan. 3, 1974

[21] Appl. No.: 430,483

Related U.S. Application Data

[63] Continuation-in-part of Ser. No. 309,803, Nov. 27, 1972, Pat. No. 3,845,394.

[30] Foreign Application Priority Data

Jan. 9, 1973 Japan .................................. 48-5431

[52] U.S. Cl. ................ 325/456; 325/455; 325/465; 325/468

[51] Int. Cl. ............................................. H04b 1/06

[58] Field of Search ........... 325/452, 453, 455, 456, 325/457, 459, 464, 465, 468, 470, 478

[56] References Cited

UNITED STATES PATENTS

| | | | |
|---|---|---|---|
| 3,163,823 | 12/1964 | Kellis et al. | 325/453 |
| 3,619,492 | 11/1971 | Evans | 325/453 |
| 3,671,869 | 6/1972 | Wolfram | 325/455 |
| R25,599 | 6/1964 | Tate | 340/172.5 |

*Primary Examiner*—Benedict V. Safourek
*Assistant Examiner*—Jin F. Ng
*Attorney, Agent, or Firm*—Lewis H. Eslinger; Alvin Sinderbrand

[57] ABSTRACT

A broadcast receiver having a tuner with a variable local oscillator for generating a local frequency signal, a divider for dividing the local frequency signal at a variable dividing ratio, a comparator for comparing the divided local frequency output with a reference signal and for controlling the local oscillator frequency, a counter having a variable content by which the dividing ratio of the divider is determined for selecting the radio broadcast frequency to which the receiver is tuned, a pulse generator operative to vary the counter content, and a detector circuit for producing an audio signal in response to an output from the tuner. The broadcast receiver is further provided with a non-voltaic memory device for storing signals representing the content of the counter when the counter is changed, means for reading out the signal stored in the non-voltaic memory device and for presetting into the counter the signal read out from the memory when a power source for the receiver is turned ON, and a muting circuit for muting the produced audio signal during the operation of counter to select the radio broadcast frequency.

15 Claims, 52 Drawing Figures

| RADIO FREQ. | LOCAL FREQ. | DIV. RATIO | CONTENT OF SEL. COUNTER |
|---|---|---|---|
| 88.1 MHz | 98.8 MHz | 106 | 00 |
| 88.3 | 99.0 | 105 | 01 |
| 88.5 | 99.2 | 104 | 02 |
| ⋮ | ⋮ | ⋮ | ⋮ |
| 107.7 | 118.4 | 8 | 98 |
| 107.9 | 118.6 | 7 | 99 |

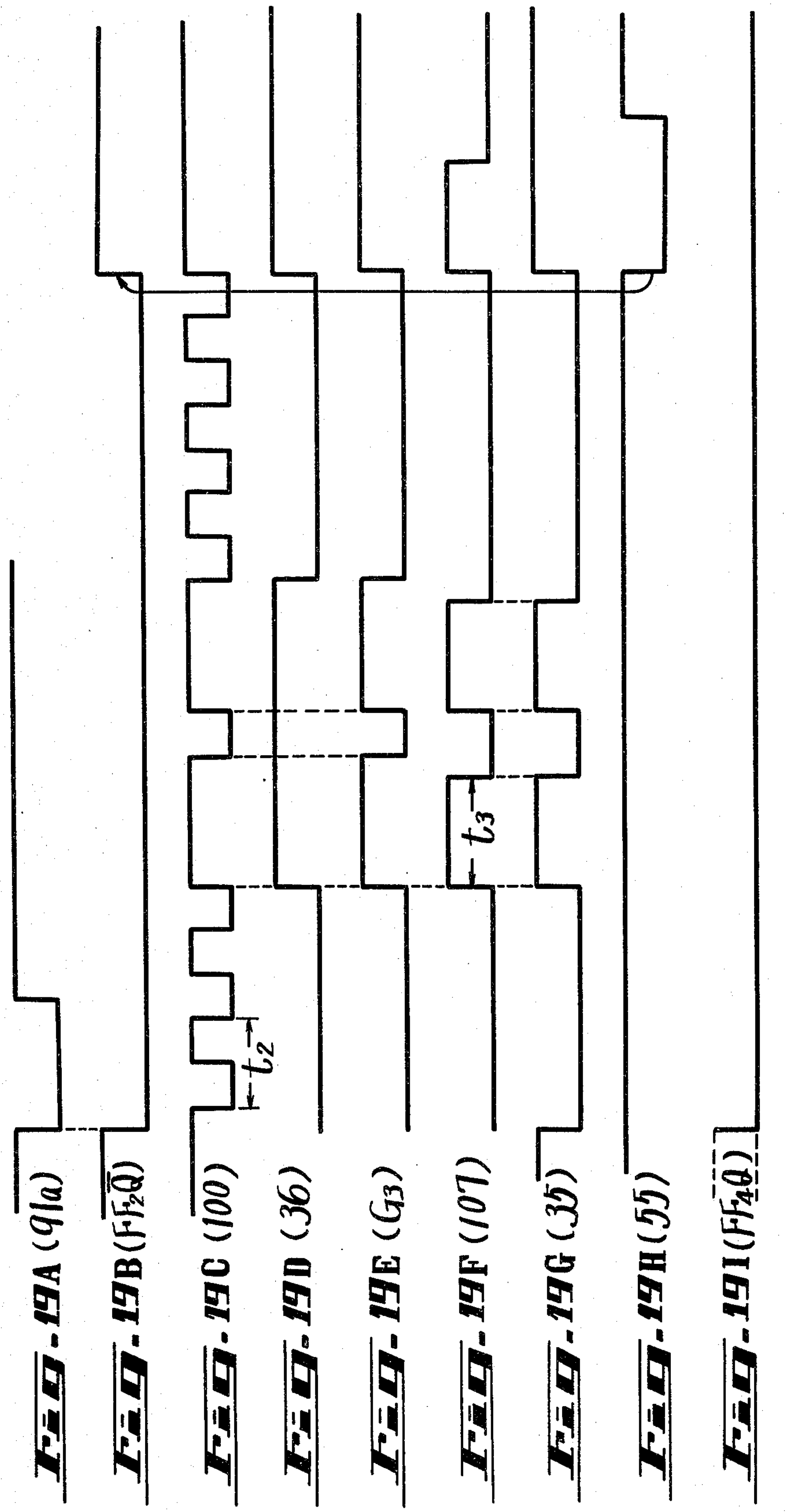
FIG. 19A (91a), FIG. 19B ($\overline{FF_2Q}$), FIG. 19C (100), FIG. 19D (36), FIG. 19E ($G_3$), FIG. 19F (107), FIG. 19G (35), FIG. 19H (55), FIG. 19I ($FF_4Q$)

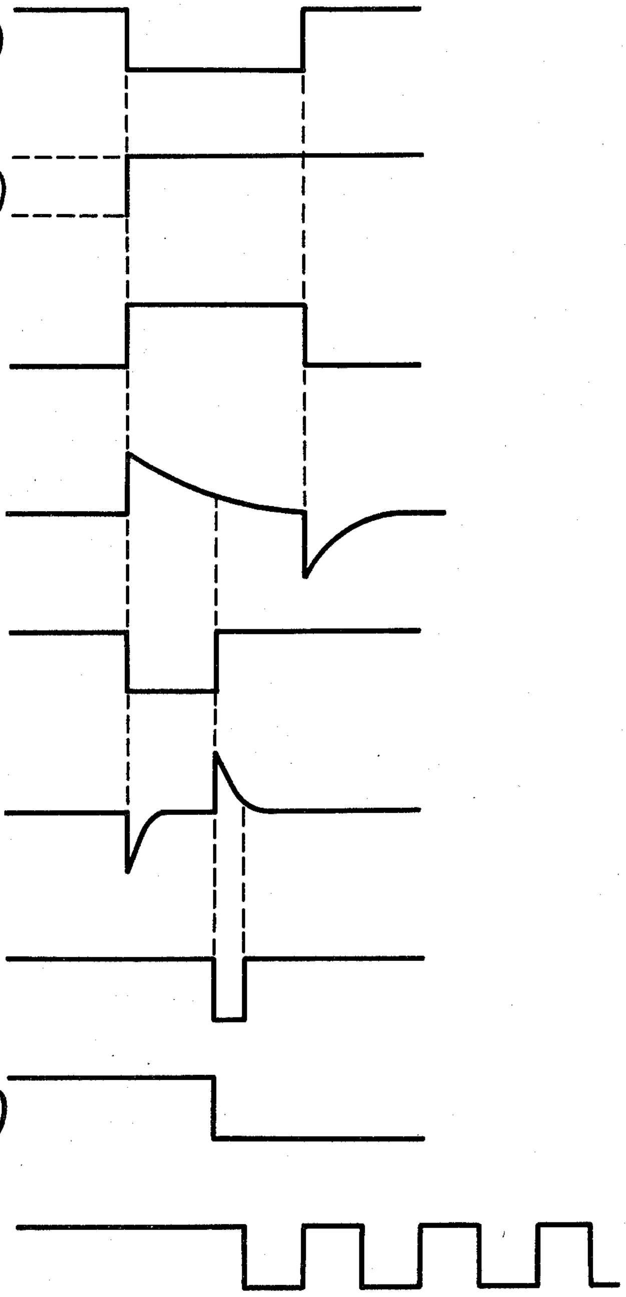
Fig. 20A (95a), Fig. 20B (FF1Q), Fig. 20C (I1), Fig. 20D (I2), Fig. 20E (I2), Fig. 20F (I5), Fig. 20G (I5), Fig. 20H (FF2Q̄), Fig. 20I (100)

BROADCAST RECEIVER

CROSS-REFERENCE

The present invention is a continuation-in-part of my application, Ser. No. 309,803, filed Nov. 27, 1972, now U.S. Pat. No. 3,845,394, assigned to the same assignee.

BACKGROUND OF THE INVENTION

1. Field of the Invention

This invention relates to a broadcast receiver, and more particularly to a novel broadcast receiver having phase locked circuits, memory and display means.

2. Description of the Prior Art

In general, a receiver may be tuned to receive intelligible information from a selected radio wave broadcasted from any desired station by varying the local frequency of a local oscillator incorporated into the receiver. As a means of varying the local frequency of the above mentioned local oscillator, it has been well known to use a variable condenser. In such a case, if a user does not know the precise frequency of the selected radio wave broadcasted from the station, it is very difficult to correctly reproduce the intelligence modulated onto radio wave broadcasted from the desired station, for example, sound in the case of radio receivers and a video signal in case of television receivers. As a result, many users must refer to the published broadcast frequencies of the stations mentioned in a program listed in news papers or magazines or must operate the variable condenser of the tuner to search the broadcast frequency spectrum for a desired station.

In this case, however, the variable condenser is manually operated, and as a result, even if the receiver is provided with a tuning meter, a correct tuning is not always possible. Moreover, it is often troublesome for the user to rotate the knob of the tuner every time a different tuning or program selection is effected.

In order to obviate such a disadvantage, automatic tuning systems have become available wherein the output of an intermediate frequency amplifier incorporated into the receiver or the output of a detector is detected and is used to vary the tuning or selection of broadcast frequency. The typical receiver adopting this kind of automatic tuning system is often found in radios mounted in automobiles rather than in radios adopted for household use. This receiver is generally characterized by a search-stop operation and suffers from the disadvantages that search-stop operations must frequently be repeated when many stations are present, and that a correct tuning is not always ensured.

A receiver having minimal interference from adjacent stations is particularly desirous for users in a district where very many broadcast stations are present. The receiver for use in such district is required to have a higher frequency sensitivity. In order to solve this problem, an AM and FM receiver using a phase locked technique has been introduced by J. Stinehelfer and J. Nichols. For example, as described in the Fairchild Semiconductor note by J. Stinehelfer and J. Nichols, 1969, entitled "A Digital Frequency Synthesizer for an AM and FM Receiver," a tunable FM synthesizer mainly consists of a voltage-controlled oscillator, divider, frequency and phase comparator, and reference frequency generator. The output of the comparator is used for changing the radio frequency to which the receiver is tuned. The divider is used for determining the particular radio frequency. The voltage-controlled oscillator is used as a local oscillator incorporated into the tuner. More particularly, the output signal of the voltage-controlled oscillator is divided by the divider, and the signal thus divided is compared in frequency and phase with a crystal-controlled reference signal. The output of the frequency and phase comparator is used as the control voltage for the voltage-controlled oscillator. The equation that indicates this operation is given by $$f_{(VCO)}/N = f_{ref} \ldots \quad (1)$$

The output of the frequency and phase comparator is used to establish the equality of this equation. If both sides of the equation (1) are multiplied by N, the equation $$f_{(VCO)} = f_{ref} \cdot N \ldots \quad (2)$$

indicates that a frequency may be generated that is an integer multiple of the reference frequency. The generated frequency is determined by the divide ratio of the divider.

In the United States, the FM broadcast band consists of 100 channels each having a bandwidth 200 KHz wide starting at 88.0 MHz. The carrier frequency for the first channel is 88.1MHz, and the carrier frequency for the one hundredth or last channel is 107.9MHz. The divider used in this frequency synthesizer may be considered as a count-down counter. This counter, the output of which is the divided frequency, is loaded or preset with the value of the divide ratio on the next clock pulse after the counter has counted down to one. All other clock pulses will result in the counter counting down or decrementing by one. If the "one" state of this counter is used to produce an output, then that output will occur once for every N input pulses, where N is the value preset in the counter. For a better understanding, consider the example in which the counter is preset to five and counts down to 1, then repeats the cycle. The counter counts as 54321 54321 etc. to thus divide the input frequency by five. Of course, it may be possible to use a count-up counter as the divider. In this case, the counter counts as 12345 12345 etc.

In the frequency synthesizer, the oscillator controlled by the output of the comparator is capable of generating an accurate local frequency so that it is possible to effect a correct tuning. In this case, however, undesirable noise signals are often amplified by the audio amplifier and then reproduced through a loud speaker during the operation of the counter. In general, such noise signals may be muted by a muting circuit, the muting circuit being controlled by the output from the intermediate frequency signal amplifier or FM discriminator. However, even if the output is obtained from the IF amplifier or FM discriminator, the phase-locked loop may not be completely stable.

A radio receiver also has been proposed having a memory means or device, for storing signals representing broadcast frequencies. A tuner is tuned to a read out signal from the memory device when the radio broadcast frequency is used again. However, since many of the memory devices used in the prior art are voltaic memory elements, after the electric power for the radio receiver is cut off once, it is necessary to store the broadcast frequency signal in the memory device once again.

An attempt to avoid this inconvenience, by using a non-voltaic memory device in the above-mentioned prior radio receiver has offered less than perfect results.

SUMMARY OF THE INVENTION

It is an object of the present invention to provide an improved broadcast receiver which can accurately receive the radio waves transmitted from broadcasting stations.

It is another object of the invention to provide a broadcast receiver which is provided with means for dividing the broadcast frequency band into a number of frequency sub-bands and means for selecting a desired frequency sub-band by a phase-locked technique to produce an audio signal during the time when the phase-locked loop is operative.

It is a further object of the invention to provide a broadcast receiver which is provided with a divider for dividing the broadcast frequency band into a number of frequency sub-bands and means for supplying pulse signals to the divider to drive the same in accordance with the pulse signals, whereby an audio signal is not reproduced during the time interval within which the pulse signals are applied to the divider and also during a predetermined time period after the supply of pulse signals to the divider is stopped so as to achieve a positive muting operation.

It is a further object of the invention to provide a broadcast receiver that is easily operated and which is provided with memory means for storing signals representing received frequencies, a switch for selecting a broadcast station, and nonvoltaic memory means for storing therein the content of a station select counter every time the counter content is changed so that after an electric power source is cut off once, when the electric power source is again turned on, a read out signal from the non-voltaic memory means is used to drive the station select counter to immediately tune the receiver to the broadcast wave which was transmitted from the previously received station without requiring the operation of a station-selection switch.

It is a yet further object of the invention to provide a broadcast receiver which can receive a broadcast frequency wave regardless of whether the broadcast frequency is one that had been stored in memory means.

It is a still further object of the invention to provide a broadcast receiver which correctly receives broadcast frequency signal with no error operation.

The above and other objects, features and advantages of the present invention will be apparent from the following description taken in conjunction with the accompanying drawings.

BRIEF DESCRIPTION OF THE DRAWINGS

FIGS. 17A to 17K, 18A to 18D, 19A to 19I, and 20A to 20I, inclusive, are waveform diagrams used for explaining the operation of the broadcast receiver of the invention.

DESCRIPTION OF THE PREFERRED EMBODIMENTS

The invention will now be described in detail with reference to an embodiment thereof as applied to an FM receiver.

Figure 1:
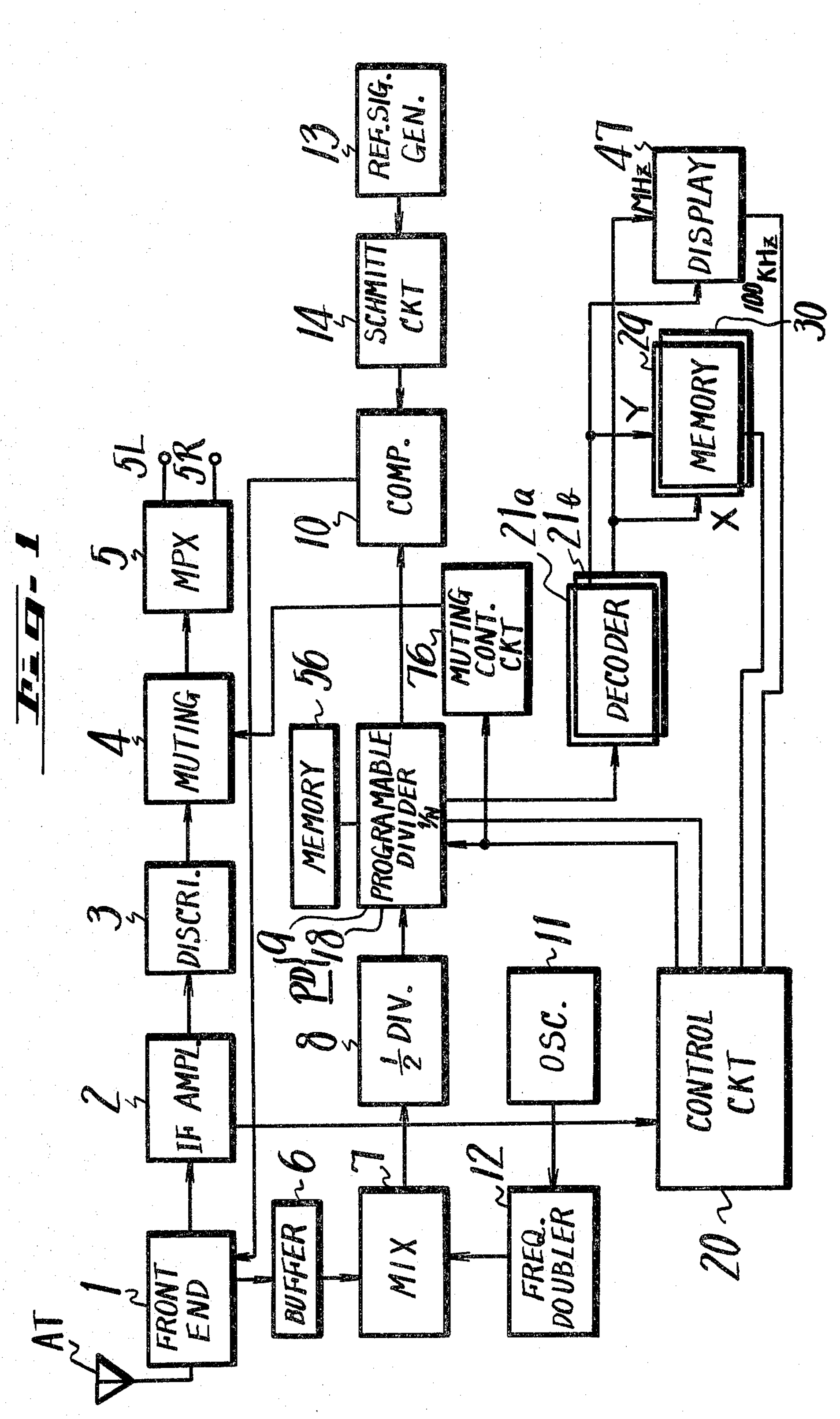
FIG. 1 is a block diagram of a broadcast receiver according to the invention.

As shown on FIG. 1, in such an FM receiver, radio waves broadcast from a number of stations are received by an antenna AT whose output is supplied to a front end 1 which includes a RF amplifier, a voltage-controlled local oscillator and a mixer. The voltage-controlled oscillator of front end 1 has a variable capacity diode and is adapted to change its oscillating frequency in response to changes in the level of a control voltage within a range, for example, from 98.8 to 118.6MHz. To the front end 1 are connected, in order, an intermediate frequency amplifier 2, an FM discriminator 3, a muting circuit 4, and a stereo multiplexer 5 having output terminals 5R and 5L from which are obtained a right stereo signal and a left stereo signal, respectively.

In general, the oscillating frequency of the voltage-controlled local oscillator of front end 1 is extracted and divided, and the resulting divided signal is compared in frequency and phase with a reference signal. The compared output is fed back to the local oscillator as a control voltage therefor to determine the oscillating frequency so as to select a desired station to which the receiver is tuned. In practice, the frequency band of the local oscillator output is a VHF band so that the local oscillator output is first supplied to a mixer 7 through a buffer amplifier 6 and to a ½ divider 8 so as to effect frequency demultiplication. The reduced frequency is then supplied through a programable divider PD comprised of an 1/N divider 9 and a station select computer 18 to a frequency and phase comparator 10. The mixer 7 is supplied with the output of an oscillator 11 consisting of a crystal oscillator having a suitably selected frequency, for example, 60MHz, through a frequency doubler 12 so that the mixer 7 is supplied with a frequency of 120MHz. The mixer 7 feeds to the divider 8 the frequency difference between the frequency of the local oscillator in front end 1 and the frequency doubler 12. The frequency and phase comparator 10 receives an oscillating output, for example, with a frequency of 100KHz, generated by a reference signal generator 13 and supplied to comparator 10 through a Schmitt trigger circuit 14. The frequency and phase comparator 10 produces a direct current voltage output depending upon the phase difference between the two input signals supplied thereto from divider 9 and circuit 14, this direct current voltage being employed as the control voltage of the voltage-controlled local oscillator in front end 1 for determining the oscillating frequency thereof. The above mentioned circuit arrangement is well known, and therefore its details will not be described.

In the stable state of the phase-locked-loop for effecting the frequency comparison, the following equation results from the above values for the frequencies of the outputs of frequency doubler 12 and reference signal generator 13:

$$120\text{MHz} - f_L/2\text{N} = 100\text{KHz} \quad 3.$$

where $f_L$ is the oscillating frequency of the voltage-controlled local oscillator in front end 1. Equation (3) can be rewritten as:

$$f_L = 120 - 0.2\text{N}[\text{MHz}] \quad 4$$

Thus, if the divide ratio N of the 1/N divider 9 is changed over the range from 7 to 106, $f_L$ can be changed from 118.6 to 98.8MHz in steps of 200KHz.

Figures 2, 3:
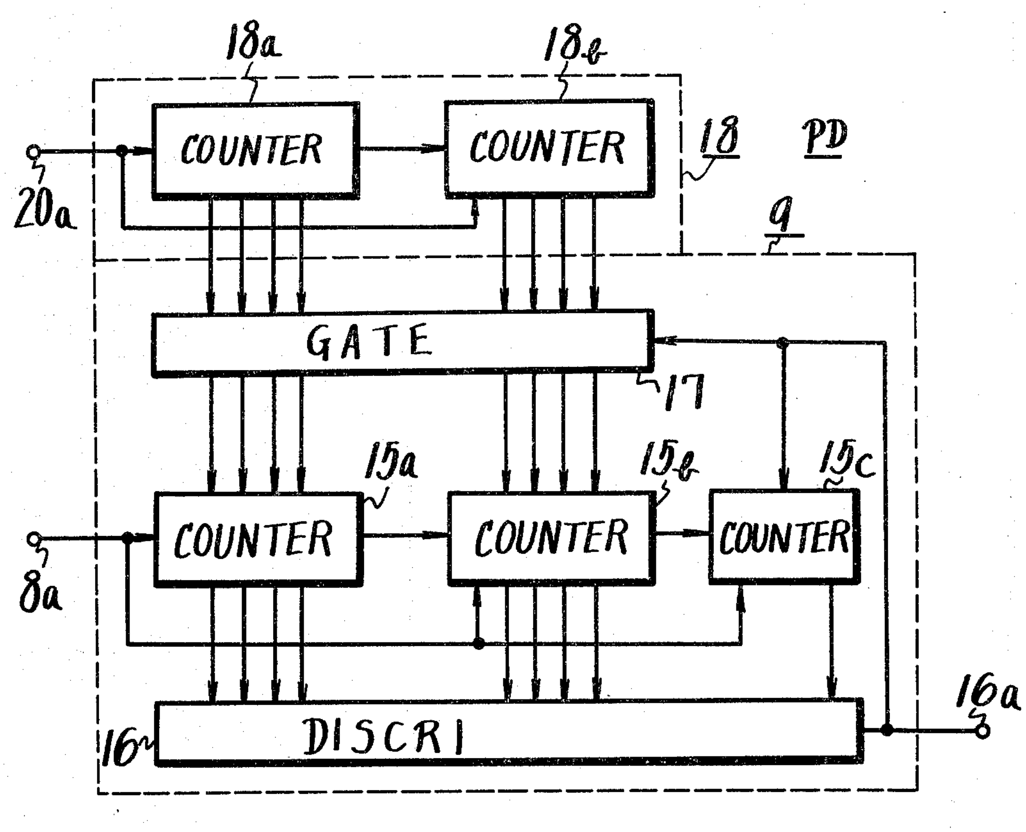
FIG. 2 is a block diagram of the station select counter and frequency divider shown in FIG. 1.
FIG. 3 is a table showing the relationship among the frequencies of the several stations of the broadcast band, dividing ratios, and contents of the station select counter that correspond to such stations.

An example of the 1/N divider 9 will be now described with reference to FIG. 2. In FIG. 2, reference numeral 8*a* indicates a terminal to which the pulse signal from the 1/2 divider 8 is applied. The pulse signal is then applied to BCD counters 15*a*, 15*b* and a binary counter 15*c*, respectively. The outputs from the counters 15*a*, 15*b* and 15*c* are supplied to a discriminator 16 which discriminates or detects when the outputs from the counters 15*a*, 15*b* and 15*c* are a predetermined decimal number. The output from the discriminator 16 is supplied to a gate circuit 17 to control the latter. In other words, when the outputs from counters 15*a*, 15*b* and 15*c* are the predetermined number, for example [106], the gate circuit 17 is opened or rendered conductive through which the contents of counters 18*a* and 18*b*, which form a station selection counter 18, are set in the counters 15*a*, 15*b* and 15*c*, respectively. In this case, since the contents of station selection counter 18 represent two decimal figures as will be described later, the binary counter 15*c* is always reset by the output from the discriminator 16. Further, since the station selection counter 18 is sufficient to count from [00] to [99], it includes two stages of counters only. When the contents of counters 15*a*, 15*b* and 15*c* again reach the predetermined number, the operation described above will be repeated. In this case, the content of station select counter 18 is determined by the number of station select pulses produced by a control circuit 20 (refer to FIG. 1), which includes a pulse generator for generating station select pulses in synchronism with clock pulses for operating the counter, the station select pulses being supplied through a terminal 20*a* to the counter 18.

When a number of pulse signals, the number being determined by subtracting the content of station selection counter 18 from the predetermined number [106], is applied to the terminal 8*a*, one pulse signal is obtained at an output terminal 16*a* of discriminator 16. Accordingly, the divide ratio N of 1/N divider 9 can be determined by the content of station select counter 18.

In this embodiment, the content of station select counter 18 is determined to satisfy the following equation for the respective received frequencies of FM broadcast waves:

[Content of counter 18]=[106]− [divide ratio N]

The relationship between the divide ratio N, the content of station select counter 18 and the local oscillating frequency for the respective received frequencies is shown in the table of FIG. 3.

By way of example, in the case where an FM broadcast wave of 88.1MHz is selected to be received, if the station select pulse signal is applied through the terminal 20a to set the station select counter 18 at the content of [000] when the pulse signals from ½ divider 8 increment the counters 15*a*, 15*b*, 15*c* to the predetermined number or 106, the gate circuit 17 is opened to set the counters 15*a*, 15*b* and 15*c* to be [000], respectively, the content of the station select counter, by the pulse signal obtained at the terminal 16*a*. Next, when the contents of counters 15*a*, 15*b* and 15*c* again incremented to 106, one pulse signal is again obtained at the terminal 16*a*. Thus, for every 106 pulse signals that are fed through the terminal 8*a*, one pulse signal is obtained at the terminal 16*a*, or the pulse signal applied to the terminal 8*a* is divided to 1/106.

If FM broadcast waves of other frequencies (88.2MHz to 107.9MHz) are desired to be received, the station select counter 18 is set at numbers corresponding to the desired FM broadcast waves to be received in a similar manner. Further, if the content of station select counter 18 is varied from [00] to [99], sequentially, the local oscillator frequency can be sweep through the received frequency band from 88.1MHz to 107.9MHz.

The driving signal for display of the MHz-figure by a panel display device 47 which will be described later and an address signal in the X-direction for memory means or devices 29 and 30, also to be described are derived from the output from the 10-figure counter 18*a* in the station select counter 18 (MHz-figure of received frequency).

The content of the station select counter 18 is applied to binary-decimal decoders 21*a* and 21*b*, respectively, and therein converted to a decimal output. The decimal output therefrom is applied to the non-voltaic memory device 29 and to the panel display device 47 as an address signal. The memory device 29 stores representations of received broadcast waves, while the panel display device 47 visually displays the broadcast wave representations. The display device 47 includes a switch, which, upon being operated, causes a stop signal to be applied to the pulse generator of the control circuit 20 to stop the application of station select pulses to the station select counter 18. Thus, the receiver is tuned to the broadcast frequency corresponding to the set content of the station select counter.

With the present invention, during the time interval when the above-mentioned phase-locked loop is operated or a station select pulse (or pulses) is applied for searching for a desired braodcast wave, means such as a circuit 76 which will be described later is provided for making the muting circuit 4 operative, so as to stop the appearance of undesired signals at the output terminals 5L and 5R during the broadcast wave searching.

Further, a non-voltaic memory means or device 56 is provided for storing the content of counter 18 at every time when the content of counter 18 is changed, so that when the power source is cut off once and thereafter the power source is turned on, the broadcast wave to which the receiver was received tuned previously is received immediately.

The present invention will be now described in detail with reference to FIGS. 4 to 16, sequentially.

Figure 4:
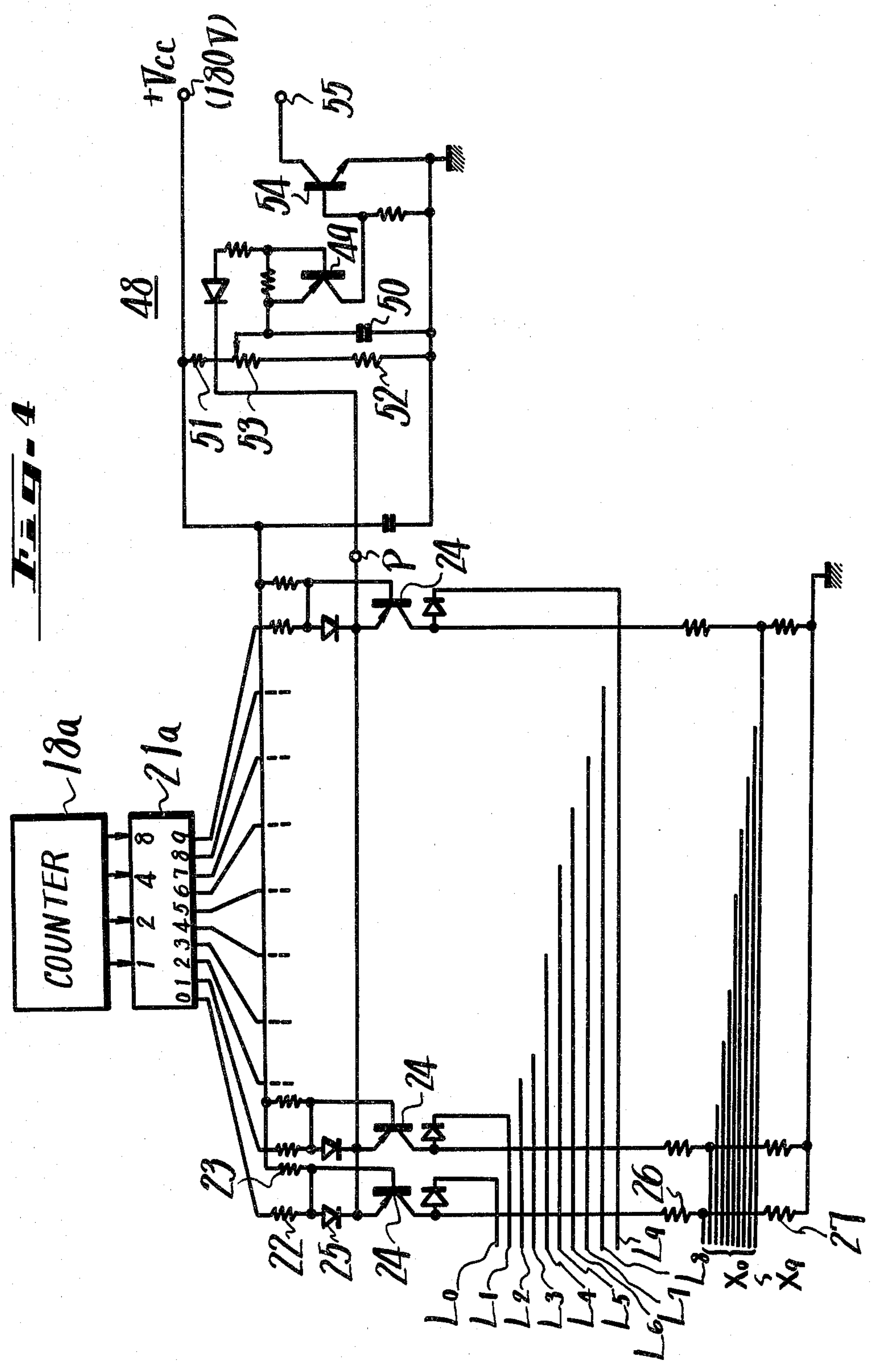
FIG. 4 is a circuit diagram showing connections between the decoder of FIG. 1, a detector circuit for switches of a display panel and a circuit for producing address signals.

In FIG. 4, reference numeral 21*a* indicates the decoder which converts the content applied from counter 18*a* as a BCD code to a decimal number. The decoder 21*a* has ten output terminals, each one adapted to be provided with OV (zero volts) in accordance with the particular BCD signal applied to the decoder input terminals while the remaining output terminals are provided with, for example, 60V. The ten output terminals are similarly connected wherein, for example, the [0] output terminal from which the decoded output [0] is obtained is connected through resistors 22 and 23 to a power source terminal Vcc provided with, for example, +180V. The connection point between the resistors 22 and 23 is connected to the base electrode of, for example, a PNP-type transistor 24 and also its emitter electrode through a diode 25 with the polarity shown in the figure. The collector electrode of transistor 24 is led out through a diode as a driving terminal $L_0$ for display of the MHz-figure of the panel display device 47, and also as an X-address terminal $X_0$ for the memory devices 29 and 30 after being coupled to divide resistors 26 and 27. The other output terminals [1] to [9] of decoder 21*a* are similarly connected with circuits and led out as driving terminals $L_1$ to $L_9$ and X-address terminals $X_1$ to $X_9$, respectively. The emitter electrodes of the transistors 24 connected to the respective output terminals of decoder 21*a* are connected in common to a point P to which a predetermined voltage is applied for driving the panel display device 47. The point P is connected with a detector circuit 48 for detecting the operation of a switch provided in the display device 47. The detector 48 will be described later in detail.

With the circuit shown in FIG. 4, if the [0] output terminal of decoder 21*a*, for example, is supplied with OV and the other output terminals are supplied with 60V, only the transistor 24 connected to the [0] output terminal is conductive. At this time, the voltage at point P is 140V and hence a DC voltage of 140V is generated at the driving terminal $L_0$ of display device 47, while this DC voltage is divided down to a DC voltage of 30V which is generated at the X-address terminal $X_0$ of the memory devices. Similarly, as the content of the station select counter 18*a* is changed, these predetermined voltages are generated at corresponding display-driving and X-address terminals sequentially.

Figure 5:
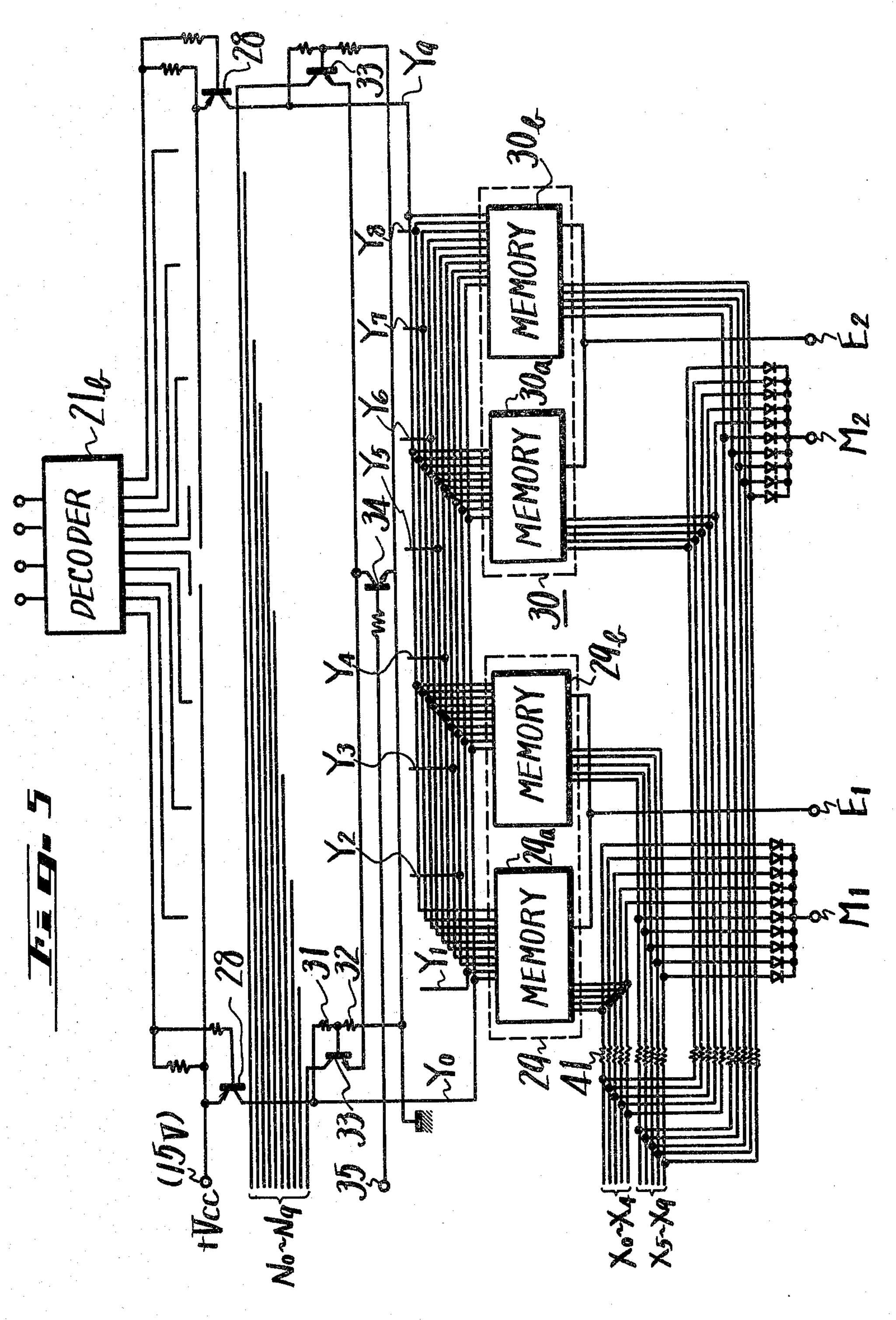
FIG. 5 is a circuit diagram showing connections between the decoder of FIG. 1 and a circuit for producing address signals.

The binary output from the counter 18*b* representing the (100KHz) figure in the station select counter 18 is applied to a decimal decoder as in the case of decimal decoder 21*a*. In FIG. 5, reference numeral 21*b* identifies this decoder. The [0] output terminal of decoder 21*b*, by way of example, is connected to the base electrode of a PNP-type transistor 28 the emitter electrode of which is supplied with a voltage of 15V from a power source terminal Vcc. When a decoded output is derived from the [0] output terminal of decoder 21*b*, the voltage level thereat changes to 0V from 60V to make the transistor 28 conductive and hence an output of 15V from the power source Vcc appears at the collector electrode of transistor. 28. The output of 15V is applied to a Y-address terminal $Y_0$ of memory devices 29 and 30, respectively. The memory device 29 is comprised of memory members 29*a* and 29*b* each of which is provided with non-voltaic memory elements such as MAOS elements arranged in 5 rows and 10 columns to collectively form 100-bit memory. Similarly, the other memory device 30 is comprised of memory members 30*a* and 30*b* each of which is provided with non-voltaic memory elements arranged in 5 rows and 10 columns to collectively form a 100-bit memory. The memory device 29 is automatically written with the contents of the station select counter, while the other memory device 30 can have its content changed as desired. The respective Y-address terminals of memory members 29*a*, 29*b*, 30*a* and 30*b* are connected common.

The X-address terminals of memory member 29*a* in memory device 29 and memory member 30*a* in memory device 30 are supplied with the X-address signals generated at the terminals $X_0$ to $X_4$, the address signals being produced as described in connection with FIG. 4, while the memory members 29*b* and 30*b* are supplied with the address signals generated at terminals $x_5$ to $X_9$.

In the example of FIG. 5, some components of the memory devices 29 and 30, such as readout terminals, are omitted for the sake of brevity.

The other output terminals of the decoder 21*b* are connected to respective PNP-type transistors 28 whose collector electrodes are connected to Y-address terminals $Y_1$ to $Y_9$ of memory devices 29 and 30, respectively in a manner similar to that described above with respect to the [0] output terminal. The collector electrodes of the transistors 28 are coupled to ground through series connected resistors 31 and 32, respectively, and the connection points between resistors 31 and 32 are connected to the base electrodes of NPN-type transistors 33, respectively. The collector electrodes of the transistors 33 are led out as respective driving terminals $N_0$ to $N_9$ for display of the 100KHz-figure of the panel display device 47 and the emitter electrodes of transistors 33 are commonly coupled to ground through the collector-emitter path of a transistor 34. A terminal 35 led out from the base electrode of transistor 34 is adapted to be supplied with a control signal of high level which is produced by the control circuit 20 based upon the read out output from the memory device 29 or 30. That is, uless the transistor 34 is turned ON by the control signal, even if a decoded output is produced at any output terminal of the decoder 21*b*, the transistor 33 corresponding to the output terminal is not turned ON. As a result, no driving signal for display of the 100KHz-figure of the panel display device 47 is applied thereto.

Figure 7:
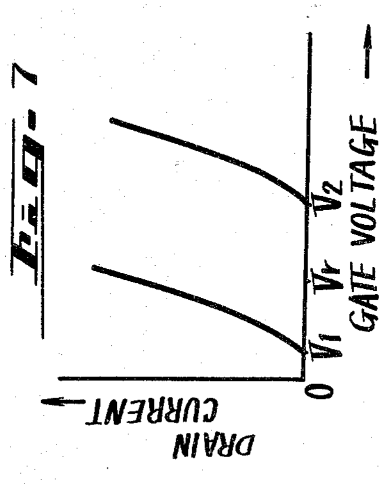
FIG. 7 is a graph showing characteristic curves of the memory elements.
Figure 6:
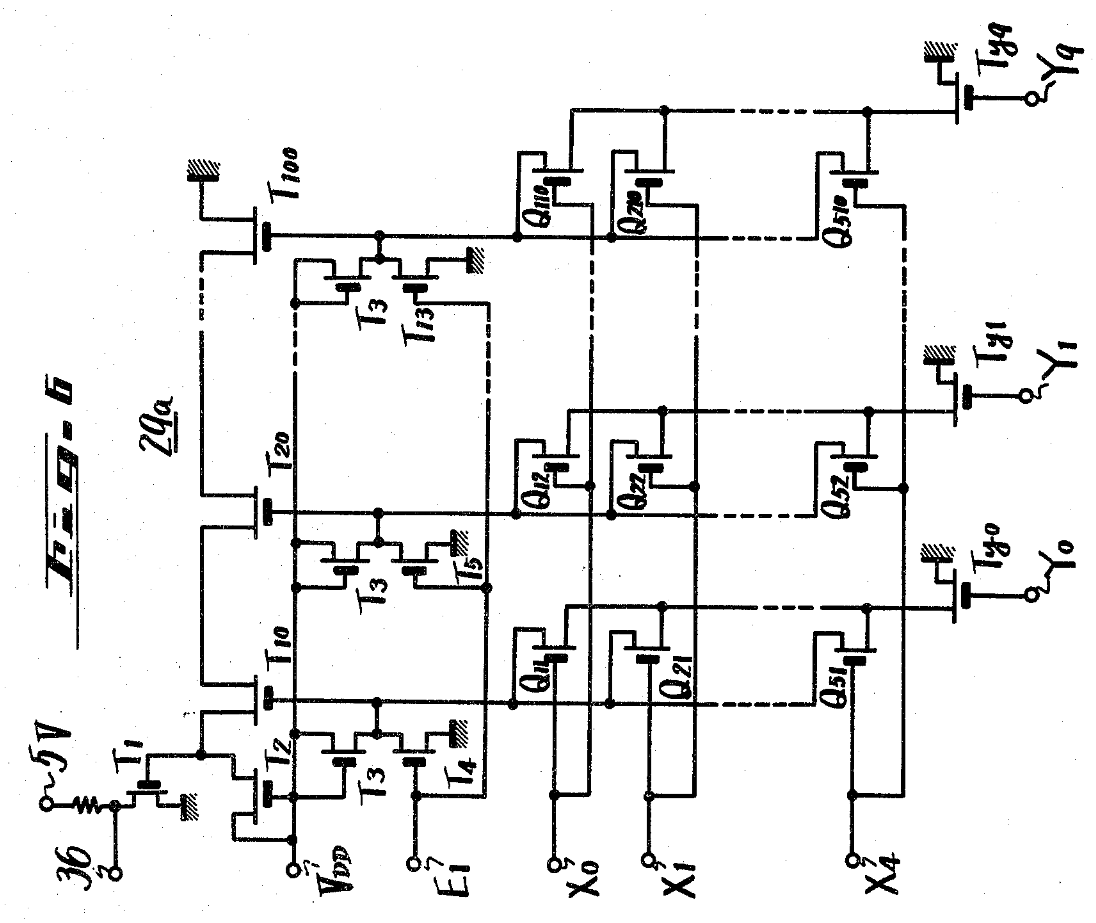
FIG. 6 is a circuit diagram of a memory made up of memory elements arranged to form a matrix.

One exemplary embodiment of, for example, the memory member 29*a* will now be described with reference to FIG. 6. As shown in FIG. 6, 50 MAOS elements $Q_{11}$, $Q_{21}$, . . . $Q_{510}$ are arranged in a matrix of 5 rows and 10 columns to form a memory member of 50 bits capacity. To the X-address terminals $X_0$, $X_1$, . . . $X_4$ there are connected the gate electrodes of MAOS elements ($Q_{11}$, $Q_{12}$, . . . $Q_{110}$), ($Q_{21}$, $Q_{22}$, . . . $Q_{210}$), . . . ($Q_{51}$, $Q_{52}$, . . . , $Q_{510}$) in common in the respective rows, while the Y-address terminals $Y_0$, $Y_1$, . . . $Y_9$ are connected to the gate electrodes of junction type field effect transistors (which will be hereinafter referred to as FET)$T_{y0}$, $T_{y1}$, . . . , $T_{y9}$, respectively. The source electrodes of FETs $T_{y0}$, $T_{y1}$, . . . , $T_{y9}$ are grounded, respectively, and the drain electrodes of FETs $T_{y0}$, $T_{y1}$, . . . , $T_{y9}$ are connected to the source electrodes of MAOS elements $Q_{11}$, $Q_{21}$, . . . $Q_{51}$; $Q_{12}$, . . . $Q_{52}$; . . . $Q_{110}$, . . . $Q_{510}$ in common in the respective columns. The drain electrodes of MAOS elements in the respective columns are connected together and then to the gate electrodes of FETs $T_{10}$, $T_{20}$, . . . , $T_{100}$, respectively. The FETs $T_{10}$, $T_{20}$, . . . , $T_{100}$ are connected in series and the source electrode of FET $T_{100}$ is grounded. The drain electrode of FET $T_{10}$ is connected to the gate electrode of FET $T_1$ and also to a power source terminal $V_{DD}$ through a load FET $T_2$. The source electrode of FET $T_1$ is grounded and its drain electrode is connected to a read-out terminal 36 and to a power source of 5V through a resistor. The common connection points, of the drains of the respective MAOS elements in the respective columns are connected to the power source terminal $V_{DD}$ through load FETs $T_3$ and also to the drain electrodes of FETs $T_4$, . . . , $T_{13}$ provided for the respective columns, respectively. The source electrodes of FETS $T_4$, . . . , $T_{13}$ are grounded and their gate electrodes are connected together to an erase terminal $E_1$. As an example of a suitable non-voltaic memory element, a field effect element, for example, a MAOS element, may be used in the present invention having a gate constructed of multi-layered insulation films for shifting the threshold voltage before and after a voltage is applied to the gate. With such a MAOS element, as shown in FIG. 7, the drain current begins to flow when a first threshold voltage $V_1$ of, for example, 2V, is applied to the gate electrode and if the critical voltage, for example, a voltage higher than 22V, is applied to the gate electrode the threshold voltage is shifted. This phenomenon occurs at both positive and negative critical voltages. That is, if the gate voltage is increased to values higher than the positive critical voltage, the threshold voltage is shifted in the positive direction, while if the gate voltage is increased to values higher than the negative critical voltage, the threshold voltage is shifted in the negative direction. The second threshold voltage $V_2$ shown in FIG. 7 is the threshold voltage produced when a positive voltage of, for example, 30v, which is higher than the critical voltage, is applied to the gate electrode. When the threshold voltage is shifted as above described, it is not changed even when the voltage applied to the gate electrode is removed. The second threshold voltage $V_2$ may be restored to the first threshold voltage $V_1$ by applying a voltage higher than the negative critical voltage, for example, a voltage of -45V, to the gate electrode. If the voltage Vr which is substantially intermediate the first threshold voltage $V_1$ and the second threshold voltage $V_2$ of the MAOS element, for example, a voltage of 10V, is applied to the gate electrode, it is possible to ascertain the condition of the MAOS element by the presence or absence of drain current. If this voltage vr (10V) is used as a read out voltage, the first threshold voltage $V_1$ and the second threshold voltage $V_2$ can be considered as the conditions corresponding to [0] and [1], respectively. A gate voltage (+30V) higher than the positive critical voltage to establish this condition [1] may be used as the write voltage, and a gate voltage (−45V) higher than the negative critical voltage to restore the MAOS element to the condition [0] may be used as the erase voltage. Therefore the MAOS element may be used as an erasable memory element.

When the MAOS elements are connected as illustrated in FIG. 6, the X-address signals produced by the decoder 21*a* are supplied to X-address terminals $X_0$, $X_1$, . . . , $X_4$, respectively, to achieve scanning in the row direction, while the Y-address signals produced by the decoder 21*b* are supplied to Y-address terminals $Y_0$, $Y_1$, . . . , $Y_9$. Thus, write in, read out and erase operations are carried out by varying the level of X-address signals.

When the memory 29*a* is in an inoperative condition and is not being used, the X-address terminals $X_0$, $X_1$, . . . , $X_4$ are OV and the Y-address terminals are opened. While, when the memory 29*a* is in a write in or read out condition, the erase terminal $E_1$ is provided with OV, so that the FETs $T_4$, $T_5$, . . . , $T_{13}$ are in their OFF-state. Now, if a pulse signal of 30V is applied to the X-address terminal $X_0$ and a pulse signal of 15V is applied to the Y-address terminal $Y_0$, the FET $T_{y0}$ is turned ON, the FETs $T_{10}$, $T_{20}$, . . . , $T_{100}$ are turned OFF and the MAOS element $Q_{11}$ is supplied with a voltage of 30V at its gate electrode. Thus, a 1 is written in the MAOS element $Q_{11}$. In the case where a pulse signal of 13V is applied to, for example, the X-address terminal $X_0$ and a pulse signal of 15V is applied to the Y-address terminal $Y_0$, if the MAOS element $Q_{11}$ has previously been disposed as a 1, no drain current flows because the $Q_{11}$ gate voltage is less than the threshold voltage, so that the FETs $T_{10}$, $T_{20}$, . . . , $T_{100}$ are turned ON and consequently the FET $T_1$ is turned OFF. Thus, an output of 5V is obtained at the read out terminal 36. On the contrary, if the MAOS element $Q_{11}$ has previously been disposed as a 0, drain current flows in response to the applied gate signal to turn the FETs $T_{10}$, $T_{20}$, . . . , $T_{100}$ OFF and hence the FET $T_1$ is turned ON to supply the read out terminal 36 with an output voltage of OV.

In the case of erasing the stored content in the memory 29*a*, a pulse signal of −40V is applied to the X-address terminals sequentially and a signal of 15V is applied to the erase terminal $E_1$. Accordingly, the FETs $T_4$, $T_5$, . . . , $T_{13}$ connected to the respective columns are all turned ON. Thus, at the time when the −40V pulse signal applied to the X-address terminals terminates, the content stored in memory 29*a* is erased. The drain electrodes of all the MAOS elements are supplied with ground voltage when a 15V erase pulse is applied to terminal $E_1$ during an erase operation so as to avoid damage of the MAOS elements by an excessive voltage applied across their gate-drain electrodes when a voltage of −40V is applied to the gate electrodes.

In using the memory 29*a*, the level of the signals applied to the X-address terminals $X_0$,$X_1$, . . . , $X_4$ is varied in accordance with write, read and erase operations, as mentioned above. In the present invention, a memory control circuit 38*a* which is described below is provided to simplify the construction of the whole memory device.

The other memories 29$b$, 30$a$ and 30$b$ are constructed similar to the memory 29$a$ and memory control circuits are provided for the memory devices 29 and 30.

Figure 8:
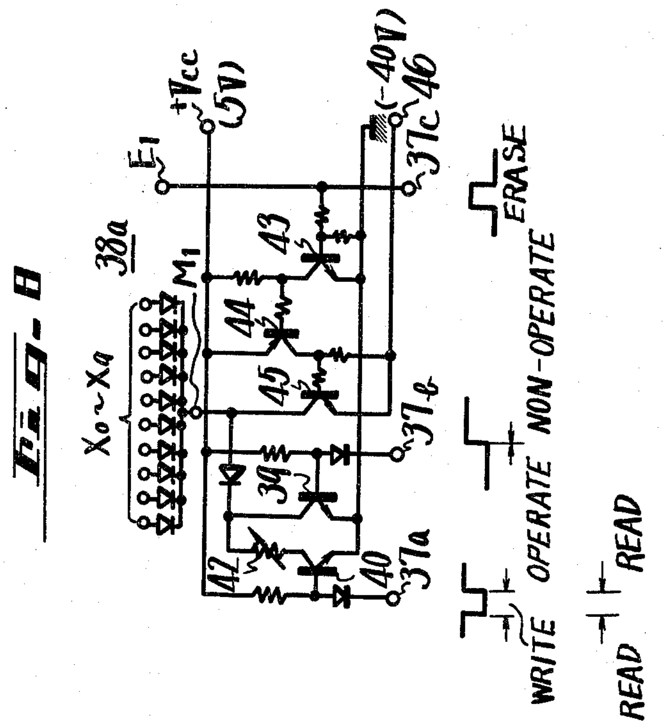
FIG. 8 is a diagram of a memory control circuit for controlling the memory shown in FIG. 6.

An embodiment of the memory control circuit 38$a$ for the memory device 29 will be now described with reference to FIG. 8.

As shown in FIG. 5, the X-address terminals for the memory device 29, by way of example, are connected through resistors 41 and diodes to an output terminal $M_1$ of memory control circuit 38$a$. The memory control circuit 38$a$ is provided with control terminals 37$a$, 37$b$ and 37$c$ so as to control the operative condition of memory device 29. The control terminal 37$b$ acts to control the operativeness and inoperativeness of memory device 29. That is, the terminal 37$b$ is provided with ground potential during operation of the memory device, but is provided with a predetermined positive potential during non-operation of the memory device. In other words, when the predetermined positive voltage is applied to the control terminal 37$b$, the output terminal $M_1$ is grounded through a diode and an NPN-type transistor 39 which is turned ON, in response to the applied position voltage. Consequently all the X-address terminals $X_0$ - $X_9$ are grounded, and the memory device 29 is made inoperative i.e., is not used. The control terminal 37$a$ is used to control the write in to and read out from the memory device 29. That is, when ground potential is applied to the control terminal 37$a$, an NPN-type transistor 40 is turned OFF and an X-address terminal can be provided with a level of 30V without being attenuated. On the contrary, when a positve potential is applied to the control terminal 37$a$, the transistor 40 is turned ON and the write in level of the X-address signal is limited to, for example, 13V which is obtained by the voltage division performed by the resistor 41 inserted into the X-address signal supply line (refer to FIG. 5) and a resistor 42. Further, if the control terminals 37$a$ and 37$b$ are opened and the control terminal 37$c$ is supplied with a positive voltage of 15V, the erase terminal $E_1$ is provided with 15V and NPN-type transistors 43 and 45 and a PNP-type transistor 44 are turned ON. Thus, the output terminal $M_1$ is connected via the conducted transistor 45 to an erase voltage supply terminal 46 to which an erase voltage of −40V is applied, and hence the X-address signals are provided with −40V.

In FIG. 5, the output terminal of a memory control circuit 38$b$ for the memory device 30 is shown by $M_2$ and its erase terminal is shown by $E_2$.

In the present invention, the display device 47 is used in correspondence with the memory device 29 or 30.

Figure 9:
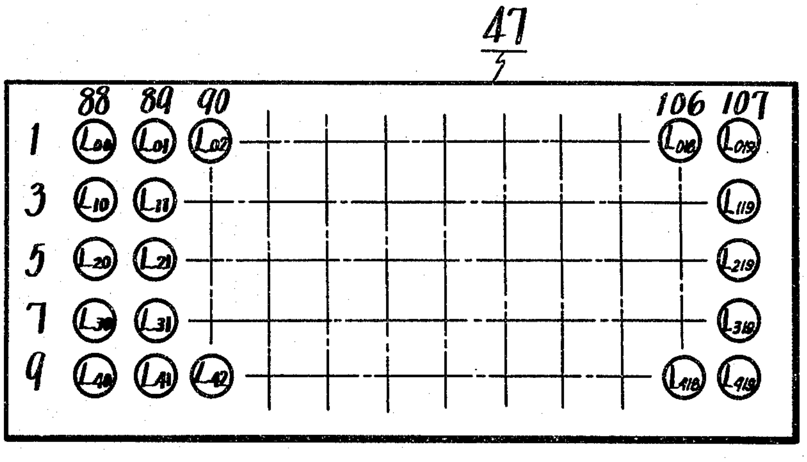
FIG. 9 is a plan view of a panel display device for use in the broadcast receiver according to the invention.

An example of panel display device 47 will now be described with reference to FIG. 9. The panel display device 47 consists of a common base plate and lamp switches $L_{00}$, $L_{01}$, . . . $L_{419}$ disposed on the base plate the number of which is the number of received frequencies or 100 and which are arranged in a matrix of 5 rows and 20 columns. The lamp switches correspond to the received frequencies by 1 : 1.

Figure 10:
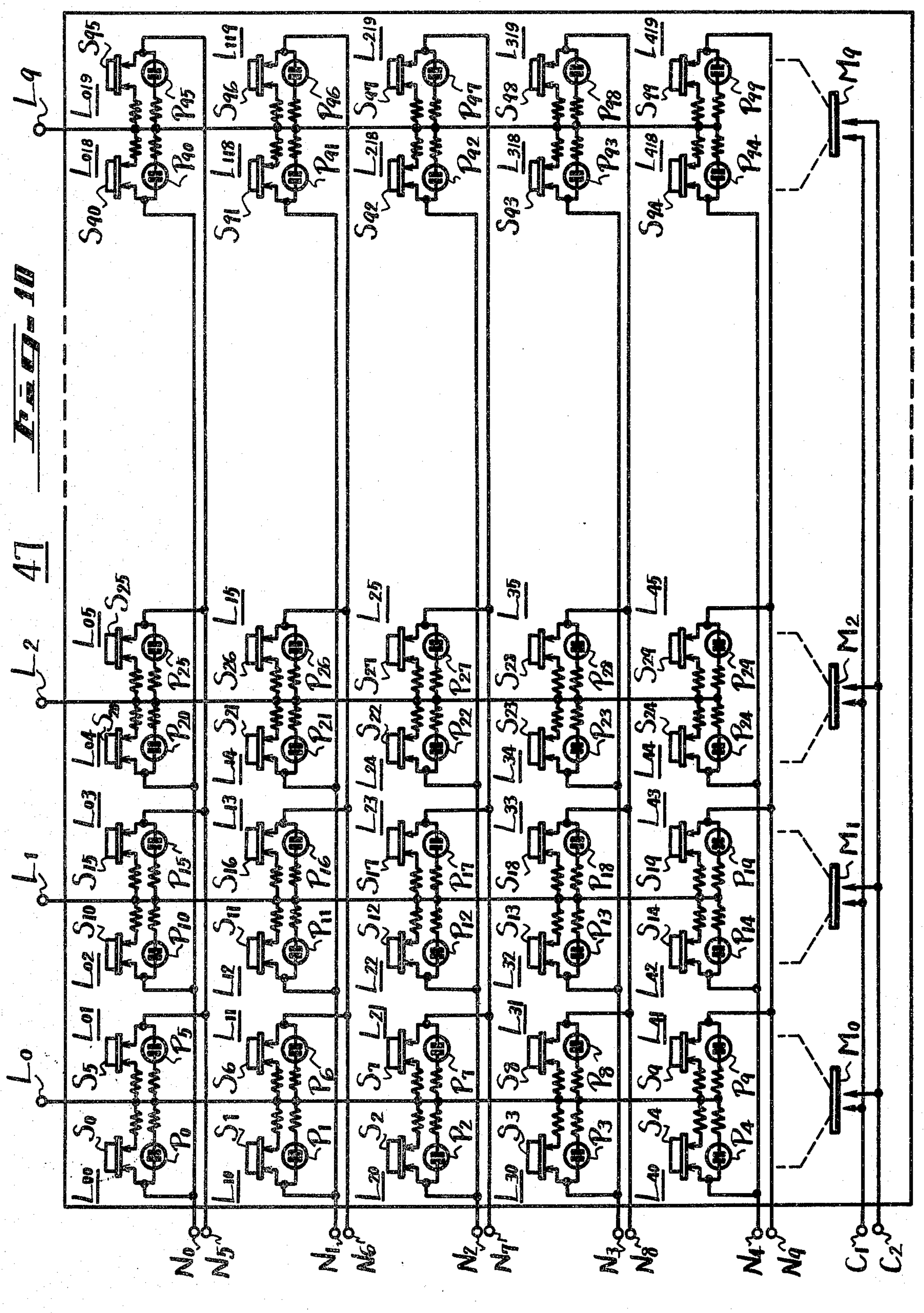
FIG. 10 is a circuit diagram of the panel display device.

The lamp switches $L_{00}$, $L_{01}$, . . . , $L_{419}$ are located at the intersections of 10 lines led out from the 10 driving terminals $N_0$ to $N_9$ for the 100KHz-figure and 10 lines led out from the 10 driving terminals $L_0$ to $L_9$ for the MHz-figure. That is, series connections of neon lamp $P_0$ to $P_{99}$ and resistors are connected between the two line groups, and series connections of push button switches $S_0$ to $S_{99}$ and resistors are connected in parallel to the former series connections, respectively, as shown in FIG. 10. As described just above, the electric connections are comprised of 10 rows and 10 columns.

As mentioned previously, the driving terminals $L_0$ to $L_9$ are sequentially supplied with outputs which are obtained by decoding the contents stored in the counter 18$a$ of the station select counter 18 for the 10-unit display (MHz-figure) shown in FIG. 4 and the decoded level at the driving terminal is the potential at the point P in FIG. 4 or about 140V. The driving terminals $N_0$ to $N_9$ are sequentially supplied with outputs which are produced by decoding the contents stored in the counter 18$b$ of station select counter 18 for the 1-unit display (100KHz-figure), as shown in FIG. 5. The decoded level of the driving terminal $N_0$ to $N_9$ is at ground level (OV). Accordingly, when the contents of station select counter 18 is changed from [00] to [99] or the receiving frequency band from 88.1MHz to 107.9MHz is swept in synchronism therewith, the neon lamps $P_0$, $P_1$, $P_2$, . . . are energized sequentially in this order. In this case, it may be assumed that a control signal is read out of the memory and is supplied through the control circuit 20 to the terminal 35 (refer to FIG. 5), so that ground level is properly supplied at terminals $N_0$ to $N_9$, whereby the neon lamps are energized.

The condition wherein any one of switches $S_0$ to $S_{99}$ is pushed down is detected by the detecting circuit 48 shown in FIG. 4. That is, when any one of switches $S_0$ to $S_{99}$ is turned ON as shown in FIG. 10, the load inserted between the driving terminals, $L_0$ to $L_9$ and ground is reduced as compared to the load when the switches $S_0$ to $S_{99}$ are OFF, and hence the potential at point P is abruptly and momentarily lowered when appropriate voltage levels are applied to the corresponding L and N driving terminals, which fact is used to detect the pushing down switch.

When any of switches $S_0$, i.e., closed, when its parallel connected lamp is energized, to thereby $S_{99}$ is pushed down to lower the potential at point P abruptly, the base potential of a PNP-type transistor 49 is also lowered abruptly. However, since a capacitor 50 is connected to the emitter electrode of transistor 49, the emitter potential thereof is not abruptly reduced and is kept at the previous potential of the power source voltage divided by resistors 51, 52 and a variable resistor 53 for a short time period. Accordingly, the transistor 49 is switched from its OFF-state to its ON-state for a predetermined time period, and consequently an NPN-type transistor 54 is turned ON. The emitter electrode of transistor 54 is connected to ground and its collector electrode is connected to a detecting terminal 55. the voltage of the detecting terminal 55 is thus switched from an open-state to ground potential for a predetermined time period when any one of the switches is pushed down at a time when its parallel connected lamp is lighted.

As shown in FIG. 10, in an embodiment of the invention, respective common contacts $M_0$, $M_1$, . . . , $M_9$ are provided on the panel display device 47 for every set of 10 lamp switches. By way of example, the contact $M_0$ is adapted to be closed when any one of the lamp switches in the first and second columns is pushed down. A terminal $C_1$ is connected in common to the contacts $M_0$, $M_1$, . . . , $M_9$ at one of their terminals, and a terminal $C_2$ is connected in common to the contacts $M_0$, $M_1$, . . . , $M_9$ at another of their terminals. Thus, when any one of the switches on the panel display device 47 is pushed down to be turned ON, the terminals $C_1$ and $C_2$ are short-circuited. A signal produced by the short-circuiting through one of the contacts $M_0$ - $M_9$ of terminals $C_1$ and $C_2$ is supplied to the control circuit 20 to initiate the generation of station select pulse and to light all the neon lamps. As will soon become apparent, when a switch corresponding to any of neon lamps is pushed down, the frequency signal corresponding thereto may be received.

It will be noted that, with the present invention a memory device 56 for storing a representation of the station which is currently being received is provided in addition to the 100 bit memory devices 29 and 30 and the display device 47 with its 100 lamps.

Figure 11:
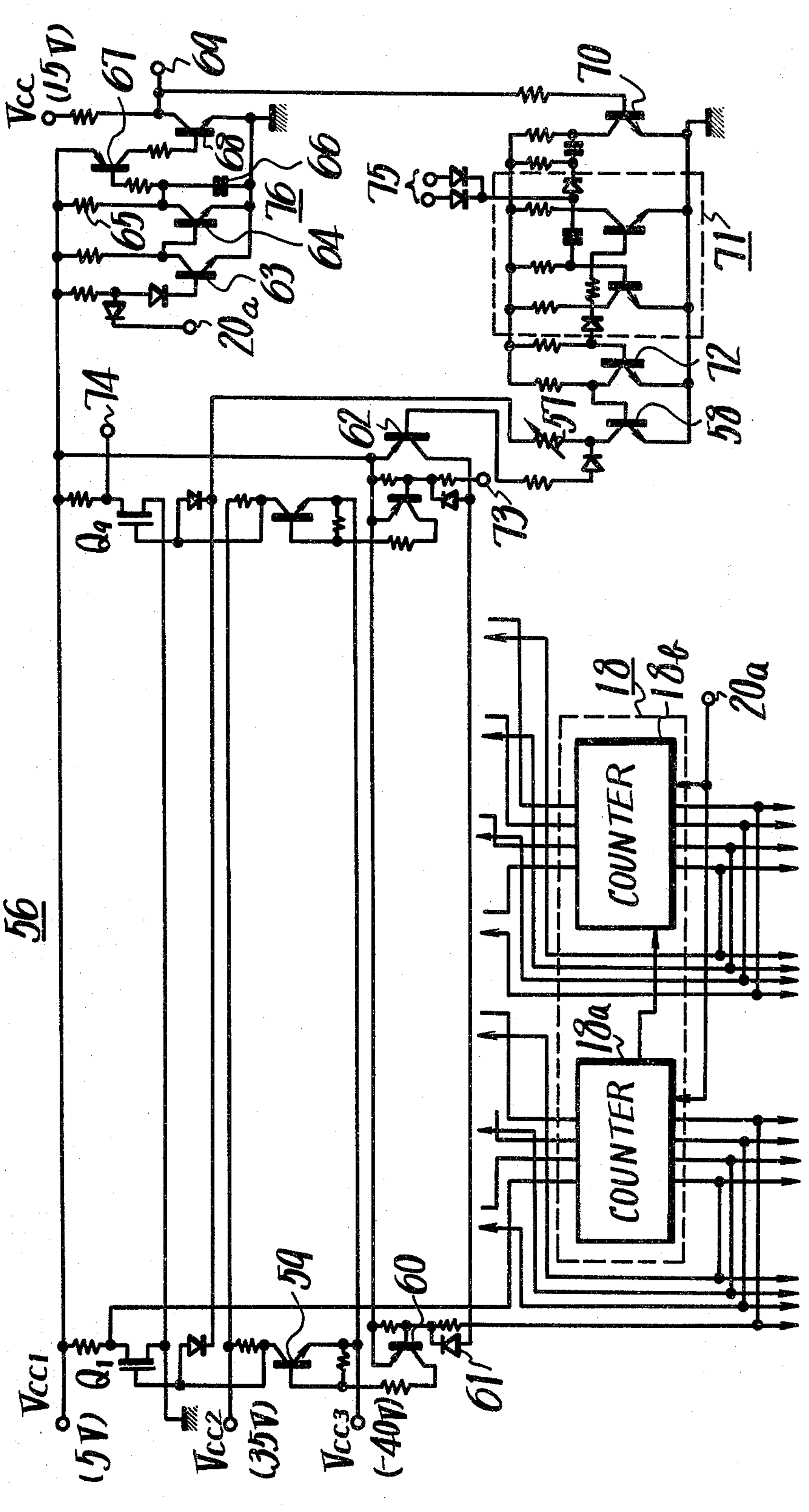
FIG. 11 is a diagram of a memory circuit for storing the content of the station select counter and for driving the counter together with a muting control circuit for controlling the muting circuit of FIG. 1.

An example of the memory device 56 will be now described with reference to FIG. 11. In order to store a representation of the received station it is sufficient to store the contents of the counters 18*a* and 18*b* of station select counter 18 at reception. In FIG. 11, reference symbol $Q_1$ indicates a MAOS element for storing the first bit of counter 18*a*. Similarly, three MAOS elements which may store second, third and fourth bits of counter 18*a* and four MAOS elements which may store first to fourth bits of counter 18*b* are provided. Further, a MAOS element $Q_9$ is also provided which stores a representation of which one of memory devices 29 and 30 is operated.

The source electrode of MAOS element $Q_1$ is connected to ground and its drain electrode is connected to an input power source $Vcc_1$ of 5V and to a preset terminal of first unit counter 18*a* in the station select counter 18. An output of 5V is produced at the drain electrode of MAOS element $Q_1$ if the element $Q_1$ is non-conducting or 0, but an output of OV is produced at the drain electrode if the element $Q_1$ is 1 at the time when a read out output is produced. The gate electrode of MAOS element $Q_1$ is connected through a diode and a variable resistor 57 to the collector electrode of an NPN-type transistor 58 the emitter electrode of which is connected to ground. The gate electrode of element $Q_1$ is further connected to the collector electrode of an NPN-type transistor 59 which is connected at its collector electrode to a power source terminal $Vcc_2$ of 35V and its emitter electrode to a power source $Vcc_3$ of −40V. The base electrode of transistor 59 is connected through a resistor to its emitter electrode and also through a resistor to the collector electrode of a PNP-type transistor 60. The base electrode of transistor 60 is supplied with the output from the counter 18*a* corresponding to the first bit and is also connected through a diode 61 to the collector electrode of a PNP-type transistor 62. The emitter electrode of transistor 62 is connected to the power source $Vcc_1$ and its base electrode is connected through a resistor and a diode to the collector electrode of transistor 58.

The other MAOS elements or seven MAOS elements $Q_2$ - $Q_8$ (not shown) are similarly connected and their read out outputs are supplied to the input preset terminals of counters 18*a* and 18*b*, while their write in inputs are derived from the respective bits of counters 18*a* and 18*b*. As mentioned previously, the outputs of counters 18*a* and 18*b* are also supplied to the counters 15*a*, 15*b* and decoders 21*a* and 21*b*, respectively.

The manner in which the MAOS element $Q_1$, for example, is controlled so as to write 1 or 0 therein will be now described. When writing in the transistor 58 is turned OFF and hence the transistor 62 is turned OFF. If the first bit output of the counter 18*a* is 1 (5V), the transistor 60 is turned OFF and consequently the transistor 59 is turned OFF with the result that the gate electrode of MAOS element $Q_1$ is supplied with a voltage of 35V from the power source $Vcc_2$ and hence 1 is written in. On the contrary, if the first bit output of counter 18*a* is 0 (OV), the transistor 60 is turned ON and hence the transistor 59 is turned ON with the result that the gate electrode of MAOS element $Q_1$ is supplied with erase voltage of −40V from the power source $Vcc_3$. When reading out the data stored in the MAOS elements, the transistor 58 is turned ON to turn the transistor 62 ON but the transistors 60 and 59 are turned OFF. At this time the gate electrode of MAOS element $Q_1$ is supplied with a voltage of 13V which is obtained by dividing the voltage of 35V from the source $Vcc_2$ with the series circuit including the resistor diode and variable resistor 57 to achieve the read out operation. The same control is also performed with respect to the other seven MAOS elements.

Figures 12A, 12B, 12C, 12D:
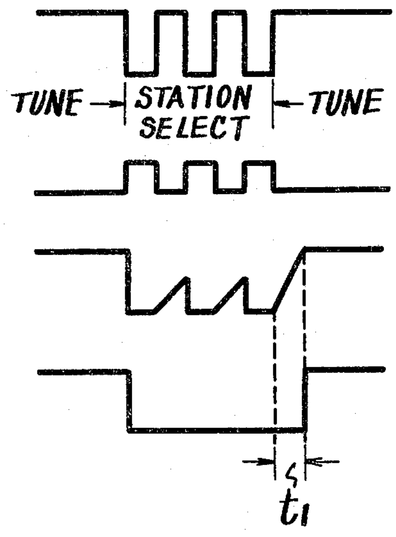
FIGS. 12A to 12D are waveform diagrams used for explaining the operation of the muting signal control circuit shown in FIG. 11.

In this embodiment, in order to store in the memory 56 a representation of the station which is now received, the transistor 58 is turned OFF when receiving only. To this end, a station select pulse shown in FIG. 12A is applied through a terminal 20*a* to the base electrode of an NPN-type transistor 63 to produce at its collector electrode a phase-reversed pulse shown in FIG. 12B. The phase-reversed pulse is applied to the base electrode of a transistor 64. The station select pulse is a repeating pulse with a predetermined period during a station select operation, but upon reception of a broadcast frequency the incrementing of the counter 18 is stopped and hence the station select pulse is maintained at a predetermined level as shown in FIG. 12A. If an integrating circuit consisting of a resistor 65 and a capacitor 66 is connected between the collector electrode of transistor 64 and ground, an output shown in FIG. 12C is obtained which is applied to the base electrode of a PNP-type transistor 67. If the time constant of the integrating circuit is selected suitably, the output level of the integrating circuit is not sufficient to turn the transistor 67 ON during the station selection mode, i.e., when the station select pulses are applied to terminal 20*a*, but is sufficient to turn the transistor 67 ON upon reception of a broadcast frequency, i.e., when the incrementing of the counter 18, and thus the application of pulses to terminal 20*a*, is stopped. Accordingly, if the transistor 67 is connected to an NPN-type transistor 68, a terminal 69 led out from the collector electrode of transistor 68 is provided with a signal shown in FIG. 12D which is maintained at OV for a time delayed by a time interval $t_1$ from the time a selected broadcast is received. The signal shown in FIG. 12D is used as a signal for controlling the muting circuit 4, so that the described circuit 76 may be referred as to a muting control circuit.

The signal obtained at the terminal 69 is phase-reversed by a transistor 70, and then differentiated and supplied to the trigger terminal of a monostable multivibrator 71 which produces a square waveform output of about 100 ms (milli-seconds). This square waveform is phase-reversed by a transistor 72 and then applied to the base electrode of transistor 58. Thus, the transistor 58 is turned OFF for a time interval of about 100ms delayed by the time interval $t_1$ from the time of reception. During the 100ms interval the content of station select counter 18 corresponding to the received frequency is written in the memory device 56 comprised of MAOS elements $Q_1$, . . . .

The MAOS element $Q_9$, which stores representation of which of the memory devices 29 and 30 is operated is controlled by the ON and OFF operations of transistor 58 during the same time interval that 8-bit MAOS elements $Q_1$, . . . are controlled. The write in operation of 1 or 0 to the MAOS element $Q_9$ is performed by a signal supplied to a terminal 73 and the read out output from element $Q_9$ is delivered to provided at a terminal 74. The terminal 73 is supplied with the output from a flip-flop in the control circuit 20 which indicates which memory device is used. The output provided at the terminal 74 is used to control the flip-flop when power is initially supplied. However, the control of the MAOS element $Q_9$ is not limited to the mode wherein the transistor 58 is switched in accordance with the output of the monostable multivibrator 71 during a broadcast tuning operation. Thus, a trigger pulse generated at a change of memory device is applied to the monostable multivibrator 71 through terminals 75.

As mentioned above, since non-voltaic memory elements are used in the memory device 56, the stored content therein is not erased even if the supply of power is cut off. When the power is supplied again, the content stored in the memory device 56 is automatically preset in the station select counter 18 and a particular memory element 29 or 30 to be used is indicated. If the received station is stored in the memory device 56 as described above, when the power supply is cut off once and thereafter power is resupplied, it is not necessary to search for the station previously received. Alternatively, if instead of making constructing the memory device 56 of non-voltaic elements, a separate electric power source is provided therefor, the same effect can be achieved.

Figure 13:
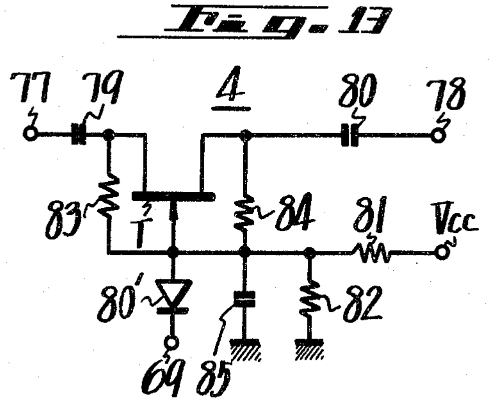
FIG. 13 is a circuit diagram of the muting circuit shown in FIG. 1.

An example of the muting circuit 4 will now be described with reference to FIG. 13. In FIG. 13, reference letter T indicates an N-channel type FET, 77 an input terminal connected through a capacitor 79 to the drain electrode of FET T and 78 an output terminal connected through a capacitor 80 to the source electrode of FET T. To a terminal 69 which is led out from the gate electrode of FET T through a diode 80′ there is applied a signal which is approximately OV when the receiver is not tuned to a broadcast frequency but rises to a predetermined level (15V) delayed by the time interval $t_1$ when the receiver is tuned as shown in FIG. 12D. Accordingly, during reception the FET T is turned ON to define a conducting path between terminals 77 and 78 and a low frequency signal is delivered to the output terminal 78 to produce sound, while during the selection of stations the FET T is turned OFF and hence no sound is produced at the output terminal.

With the muting circuit 4 shown in FIG. 13, a predetermined DC voltage from the power source Vcc is applied to the drain and source electrodes of FET T through resistors 83 and 84, respectively, after being divided by resistors 81 and 82. In this case, the connection point between resistors 83 and 84 is connected to ground through a capacitor 85.

On the assumption that the DC potentials at the drain and source electrodes of FET T are made equal, when the FET T is changed from its OFF-state to its ON-state, any variation of DC potential is avoided and hence the heretofore annoying click noise is also prevented from being generated. The capacitor 85 serves to prevent any the low frequency signal from the input terminal 77 leaks to the output terminal 78 when the FET T is OFF.

As described above, since the muting circuit 4 is controlled by the muting control circuit 76, the muting operation can be suitably carried out. That is, the signal supplied to the terminal 69 as shown in FIG. 12D falls almost instantaneously when the receiver is deviated from a tuned condition, as by selecting another frequency, to thereby block the transmission of signals from terminal 77 to terminal 78, but rises after being delayed by the time interval $t_1$ when the reciever is then subsequently tuned to then enable audio signals to be reproduced. Accordingly, the disadvantage, which occurs in the prior art where the muting operation is carried out based upon the output from the IF amplifier 2 or frequency modulator 3 and a DC component in the muting control circuit is varied when a sound is produced to thus sound a click noise through a speaker, is avoided by the present invention.

Further, in accordance with the invention since the low frequency signal is not passed to the terminal 78 until after the time interval $t_1$ from the time the receiver is tuned to a selected frequency, the phase-locked loop is provided with sufficient time to attain a stable condition after tuning is completed, and hence the generation of the aforenoted click noise is prevented completely.

Further, in accordance with the present invention a muting control operation is carried out such that no sound is produced with the power source is connected and disconnected.

With the present invention exemplified as above, an FM receiver (synthesizer receiver) which uses frequency synthesizing techniques is provided. By varying the divide into N of 1/N divider 9 the local oscillation frequency of front end 1 is changed and hence the received channel to which the receiver is turned is switched. The divide ration N of 1/N divider 9 is determined by the content of the station select counter 18 which corresponds to each received frequency channel by 1:1. The content of station select counter 18 is converted to a decimal output by binary-decimal decoders 21a and 21b, and the decimal output is used to drive the panel display device 47 and to address the addresses of 100 bit memory devices 29 and 30. The push button switches are provided in association with the respective neon lamps of panel display device 47 and when a push button switch is pushed down it is detected by the detecting circuit 48. The memory 56 is provided in association with the station select counter 18 and the content of station select counter 18 corresponding to a received frequency is automatically stored in the memory 56. As the content of the counter 18 is changed every time the received frequency is switched, so also is the content of the memory 56.

Figure 14:
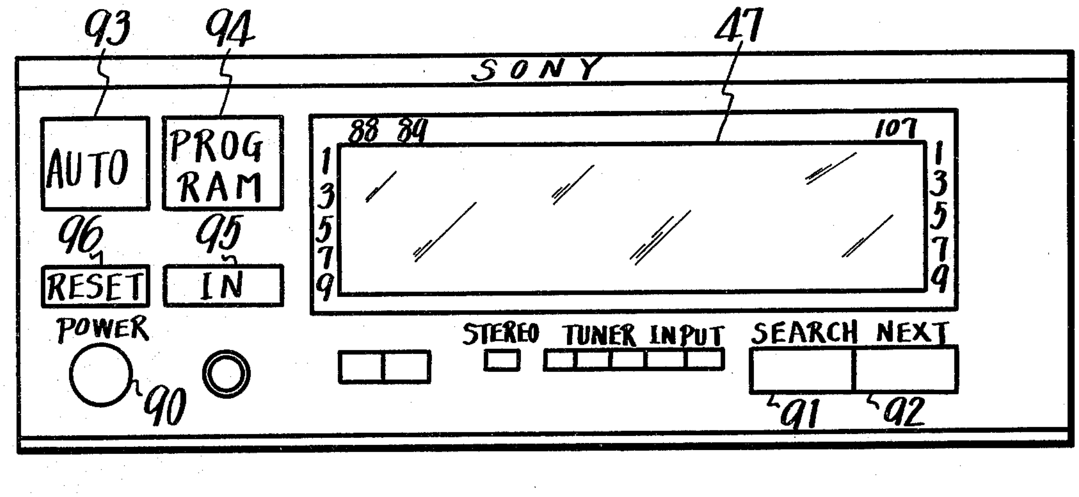
FIG. 14 is a front view of the broadcast receiver of the invention.

The manner in which the synthesizer receiver including the memories 29 and 30, panel display device 47 and memory 56 is controlled by the control circuit 20 in accordance with an operating button group will now be described. In an exemplary embodiment of the present invention the panel display device 47 is provided on a front panel, and a power source switch 90 and six button switches 91, 92, 93, 94, 95 and 96 are provided on the front panel around the display device 47, as shown in FIG. 14. The notations "SEARCH," "NEXT," "AUTO," "PROGRAM," "IN" and "RESET" are provided in connection with the switches 91 to 96. When these button switches are operated, the receiver is controlled by the control circuit 20 to perform predetermined functions.

A brief outline of these functions will now be described. The button switch 91 (SEARCH) is operated to permit the received frequency to which the receiver can be tuned to be switched from one predetermined frequency to another predetermined frequency. At this time a broadcast frequency which could be received or a frequency which had been programmed into a memory device is displayed by a lamp of the display device 47 corresponding thereto. The button switch 92 (NEXT) is pushed down when the frequency displayed on the display device 47 is to be changed sequentially by one station. The above operations receiver will be referred to as the "SEARCH MODE" and "NEXT MODE," respectively. The button switches 93 (AUTO) and 94 (PROGRAM) are used to select which of the memory devices 29 or 30 is to be used. That is, when the button switch 93 is pushed down, the memory device 29 is made operative and at this time all of the stations capable of being received which are stored in that memory device are displayed on the panel display device 47. Similarly, when the button switch 94 is pushed down the memory device 30 is made operative and at this time the stations which are programmed therein are displayed on the display device 47. These receiver operations will be referred to as the "AUTO MODE" and "PROGRAM MODE," respectively. When the button switch 95 (IN) is operated during the reception of a frequency signal, the received frequency is stored in the memory device 30 to thus effect the programming thereof. When the button switch 96 (RESET) is pushed down during the "AUTO MODE," a broadcast band between 88.1 and 107.9MHz is swept and a frequency signal which exceeds a predetermined threshold and is capable of being received is automatically written in the memory device 29. Thereafter, the mode is changed to a "SEARCH MODE" and the stored freqeuency is displayed on the display device 47. When the button switch 96 is pushed down during "PROGRAM MODE," the memory device 30 is cleared, i.e., the content stored therein is erased.

Figure 15:
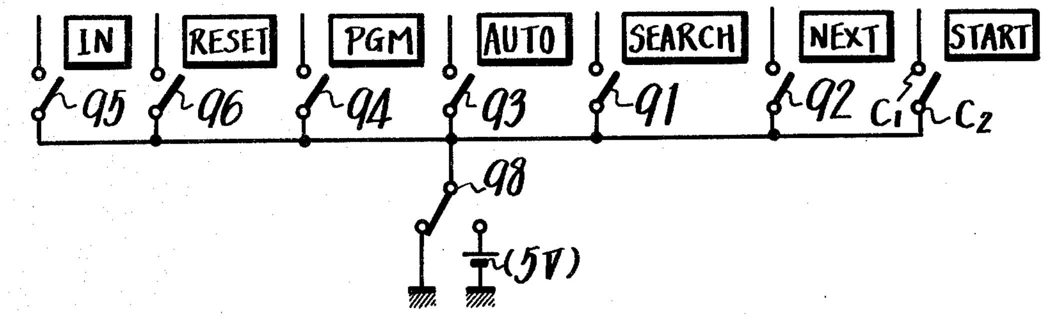
FIG. 15 is a connection diagram of a push button group shown in FIG. 14.
Figure 16:
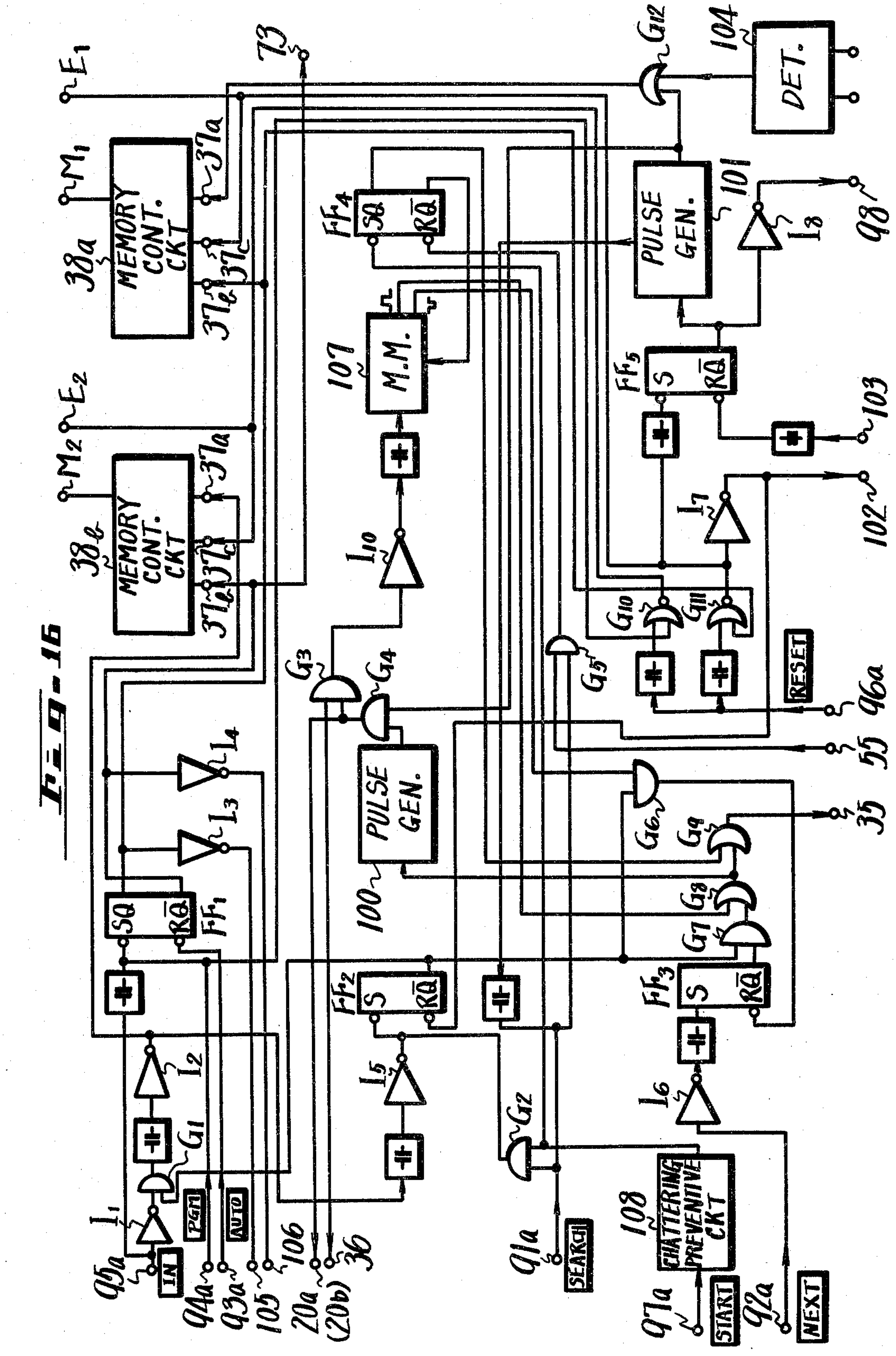
FIG. 16 is a logic block diagram of the control circuit shown in FIG. 1.

FIG. 16 is a logic diagram for showing the control circuit 20 which achieves the above functions. In FIG. 16, reference numerals 91*a*, 91*a*, . . . , 96*a* identify terminals to which the outputs of button switches 91, 92, . . . , 96 are applied, respectively, and a terminal 97*a* (START) is supplied with an output derived from the common contacts $M_0$, $M_1$, . . . , $M_9$ of display device 47 (refer to FIG. 10). The above button switches are single-pole single-throw switches of the non-lock type. One contact of each switch is connected in common and led out as a terminal 98, as shown in FIG. 15. When the terminal 98 is connected to ground as figuratively illustrated (which will be hereinafter as to 0), an output of OV is obtained through any one of switches which may be closed, while when the terminal 98 is supplied with, for example, 5V (which will be hereinafter as to 1), the button switches have no effect upon the control circuit 20.

Referring again to FIG. 16 reference numerals 100 and 101 indicate station select pulse generators which comprise astable multivibrators, respectively. The station select pulse generator 100 produces a station select pulse of about 3KHz, while the station select pulse generator 101 produces a station select pulse of about 17Hz, said station select pulses being delivered to the terminal 20*a*. The pulse generators 100 and 101 start their oscillation when a 0 control signal is applied thereto. As mentioned previously, station select pulses are fed to of the station select counter 18. Input terminal 36 is supplied with the read out signal from the memory device 29 or 30 (refer to FIG. 6), while at the output terminal 35 there is produced a signal which is used to control the transistor 34 (FIG. 5) which determines whether a lamp of display device 47 is energized or not by the output from the decoder 21*b* (refer to FIG. 5). A terminal 55 is the output terminal of detector circuit 48 (refer to FIG. 4) which detects whether any of the lamp switches in the display device 47 is pushed. Terminal 102 is coupled to counter 18 and is provided with a voltage such that when it is 0 the content of station select counter 18 is set to [0] or cleared and the receiving frequency is selected to be 88.1MHz. Reference numeral 103 identifies a terminal to which a carry signal 1 is applied from the counter. The carry signal is generated when the content of counter 18 is 99. A detector circuit 104 is adopted to produce a 0 when the IF amplifier 2 produces sufficient IF output when the receiver is properly tuned to a broadcast frequency but produces a 1 when the receiver is not tuned. In FIG. 16 reference numerals 38*a* and 38*b* are the memory control circuits (refer to FIG. 8) for memory devices 29 and 30. When the signal 0 is applied to the terminals 37b, the memory devices are made operative while the terminals 37a are at 0 and 1, the write in and read out operations are performed. When the termninals 37*c* are at 1, the memory is erased.

The operation by the actuation of each button switch will hereinafter be described. With reference to FIG. 17, a description will be given first of the "AUTO RESET" mode of operation in which the button switch 96 (RESET) is depressed in the "AUTO" mode of operation. In the "AUTO" mode of operation, since the output at the terminal 93*a* is held at the level 0 by the actuation of the switch 93, the flip-flop $FF_1$ is reset, whose output Q is at the level 0 and whose output $\overline{Q}$ is the at the level 1. The output Q is applied to the terminal 37*b* of the memory control circuit 38*a* to hold the memory device 29 in its operative condition.

Figures 17A, 17B, 17C, 17D, 17E, 17F, 17G, 17H, 17I, 17J, 17K:
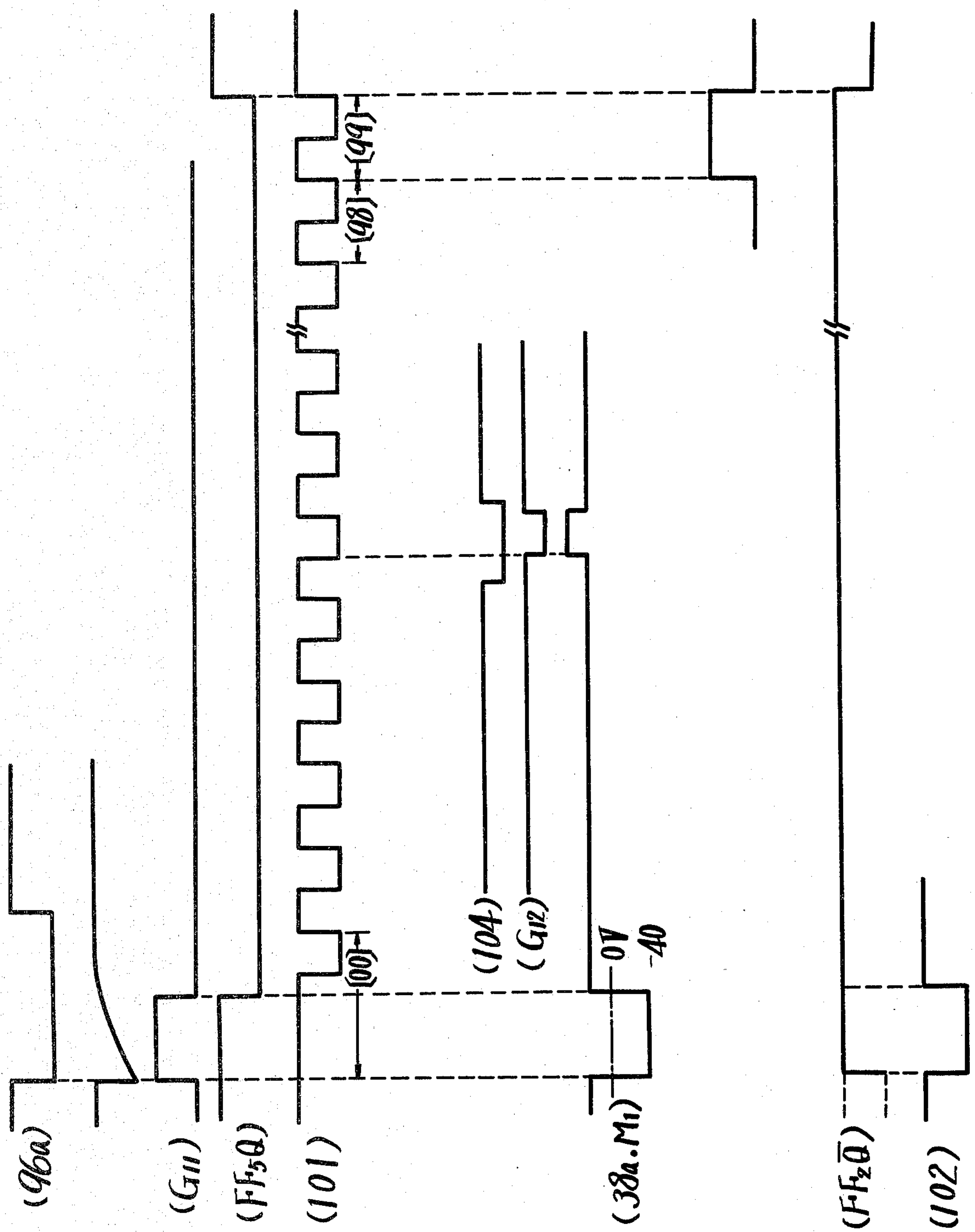

Then, upon depression of the button switch 96, the output as the terminal 96*a* has the level 0 as shown in FIG. 17A. This output is differentiated and the resulting differentiated output depicted in FIG. 17B is applied to a NOR gate $G_{11}$ and the output therefrom, shown in FIG. 17C, is supplied to an inverter to $L_7$, the terminal S of a flip-flop $FF_5$, to the terminal 37*c* of the memory control circuit 38*a* and to the terminal $E_1$. By the output derived at the terminal 102 of the inverter $I_7$, depicted in FIG. 17K, the station select counter 18 is cleared to set its content to [00] and the flip-flop $FF_5$ is set at the fall of the output from the inverter $I_7$ whereby a 0 is produced at its output $\overline{Q}$ as shown in FIG. 17D. In accordance with the pulse applied to terminals 37*c* and $E_1$, the content of the memory 29 is entirely erased. Since the output $\overline{Q}$ from the flip-flop $FF_5$ is now 0, the station select pulse generator 101 starts to oscillate to generate a station select pulse such as shown in FIG. 17E which has a frequency of 17Hz. When the output $\overline{Q}$ of flip-flop $FF_5$ is led to a terminal 98 through an inverter $I_8$, the actuation of the other buttons while the receiver is in the "AUTO RESET" mode, has no effect on the control circuit as described above with respect to FIG. 15. The station select pulses depicted in FIG. 17E is fed to the terminal 20*a* through an AND gate $G_4$ and are then supplied to the station select counter 18. If the station select pulse generator 100 does not oscillate, the input to the AND gate $G_4$ therefrom is 1, so that this AND gate is open to transmit the pulses produced by pulse generator 101. Consequently, the content of the station select counter 18 is sequentially incremented from [00] to [01], [02, ], in accordance with the station select pulses applied thereto . . . .

Of course, the broadcast frequency to which the receiver is tuned is varied by intervals of 200KHz with each incremented change in the content of the station select counter 18. When a received frequency to which the receiver is then tuned has reached a value at which a sufficient intermediate frequency output can be obtained, the detector circuit 104 produces an output at the level 0 as depicted in FIG. 17F. The outputs from the detector circuit 104 and the station select pulse generator 101 are both applied to an OR gate $G_{12}$ to derive therefrom an output shown in FIG. 17G, which is applied to the terminal 37*a* of the memory control circuit 38*a*. Accordingly, a representation of this received frequency is written in the memory device 29. Namely, as illustrated in FIG. 17H, when the button 96 is depressed, the output of the NOR gate $G_{11}$ and applied to terminal 37*c* results in an output from the terminal $M_1$ of the control circuit 38*a*, which is applied to the memory device 29, of –40V and the content of the memory device 29 is entirely erased, as previously described with respect to FIGS. 6 and 8. Then, the received frequency band is swept, by receivable frequencies are sequentially written in the memory device 29.

When the received frequency band has thus been entirely swept, a carrier pulse from the station select counter 18 representing that the counter is filled to capacity, depicted in FIG. 17I, is applied to the terminal 103. The carry pulse is differentiated and applied to the reset terminal of the flip-flop $FF_5$ to reset it at the fall of the differentiated pulse. The output $\overline{Q}$ from the flip-flop $FF_5$ is then changed to 1 as illustrated in FIG. 17D. Thus, the station select pulse generator 101 stops its oscillation as shown in FIG. 17E, terminating the sweeping operation.

Further, when the above "AUTO RESET" mode is commenced, a flip-flop $FF_2$ is reset by the output from the inverter $I_7$, that is, by the signal depicted in FIG. 17K, and the output $\overline{Q}$ from the flip-flop $FF_2$ becomes 1 as shown in FIG. 17J. After completion of the sweeping operation, an output is derived from the station select pulse generator 101, which is opposite in polarity to the output $\overline{Q}$ from the flip-flop $FF_2$, and is differentiated and applied through the AND gate $G_2$ to the flip-flop $FF_2$ to set it and its output $\overline{Q}$ is now changed to 0. The control of the flip-flop $FF_2$ is the same as that in the "SEARCH" mode in which the button switch 91 is depressed as will be described later on. Upon completion of the sweep in the received frequency band, the receiver operation is automatically altered to the "SEARCH" mode. The above description has been given in connection with the case where the button switch 96 (RESET) is depressed in the "AUTO" mode. The subsequent "SEARCH" mode that is then performed is described below. Turning now to FIG. 18, the "PROGRAM" mode of operation will now be described with regard to the case where the button switch 94 (PROGRAM) is depressed.

Figures 18A, 18B, 18C, 18D:
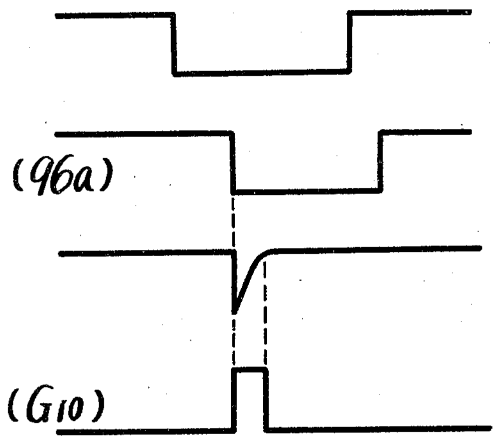

In the "PROGRAM" mode, initiated by the actuation of the button switch 94, the potential at the terminal 94*a* is 0 as depicted in FIG. 18A and the flip-flop $FF_1$ is set and its output $\overline{Q}$ becomes 0. Consequently, the output $\overline{Q}$ is applied to the terminal 37*b* of the memory control circuit 38*b*, thereby putting the memory device 30 in its operative condition. Then, depressing the button switch 96 as shown in FIG. 18B, a differentiated pulse such as depicted in FIG. 18C, which is derived at the fall of the input at the terminal 96*a*, is applied to a NOR gate $G_{10}$ to derive therefrom an output such as shown in FIG. 18D. The output thus obtained from the NOR gate $G_{10}$ is applied to the terminal 37*c* of the memory control circuit 38*b* and the terminal $E_2$, by which the content of the memory device 30 is erased.

The output $\overline{Q}$ of the flip-flop $FF_1$, which stores provides an indication of whether the memory device 29 (AUTO MODE) or 30 (PROGRAM MODE) is operative, is led to a terminal 73 to store this indication of the operative condition of the memory device in the MAOS element of the ninth bit of the memory device 56 as shown in FIG. 11. Namely, the output $\overline{Q}$ of the flip-flop $FF_1$ is 1 or 0 dependent upon whether the memory device 29 or 30, respectively, is in its operative condition. At the same time, the outputs Q and $\overline{Q}$ of the flip-flop $FF_1$ are applied to the terminals 105 and 106 through the inverters $I_3$ and $I_4$, respectively, to turn lamps, which are provided in association with the button switches 93 and 94, on and off thereby.

Referring now to FIG. 19, a description will be given with regard to the case where the receivable frequencies that had been stored in the memory device 29 in the aforesaid "AUTO RESET" mode or the content that had been stored in the memory device 30 by the actuation of the button switch 95 (IN) in the "PROGRAM" mode described later on is displayed on the panel display device 47 ("SEARCH" mode) so that any one of the indicated lamp switches may be depressed to receive the displayed frequency ("SEARCH STOP" mode).

Upon depression of the button switch 91 (SEARCH), the output at the terminal 91a becomes 0 as shown in FIG. 19A. The output at the terminal 91*a* is applied to the set terminal of the flip-flop $FF_2$ through the AND gate $G_2$ to set the flip-flop $FF_2$, whose output $\overline{Q}$ becomes 0 as depicted in FIG. 19B. (This set condition of the flip-flop $FF_2$ is the same as that when the sweep in the received frequency band has been completed in the "AUTO RESET" mode described above.). The output $\overline{Q}$ of the flip-flop $FF_2$ is applied as a control signal to the station select pulse generator 100 through an AND gate $G_7$ and an OR gate $G_8$ to thereby activate the station select pulse generator 100 to start oscillation whereby station select pulses are generated, such as depicted in FIG. 19C, which normally have a period $t_2$ of about 3ms. The station select pulses are applied to the AND gate $G_4$. Since the other input to the AND gate $G_4$ from the non-operating pulse generator 101 is 1, the station select pulses are applied from the terminal 20*a* to the station select counter to rapidly switch the received frequency to which the receiver is tuned.

Now, let it be assumed that a read out depicted in FIG. 19D is applied to the terminal 36 from the memory device 29 or 30. In the present example, the read output is continuously applied from the memory device 29 or 30. The read output is applied through the AND gate $G_3$, an inverter $I_{10}$ and a differentiation circuit to a monostable multivibrator 107 to trigger the latter. The monostable multivibrator 107 has a delay time $t_3$ of 5ms and is controlled by the output $\overline{Q}$ of a flip-flop $FF_4$. Namely, the monostable multivibrator 107 generates a pulse only when the output $\overline{Q}$ of the flip-flop $FF_4$ is 1. In the present example, since the output at the terminal 91*a* (FIG. 19A) is supplied through to an AND gate $G_5$ to the R terminal of flip-flop $FF_4$, the output coupled to the flip-flop is 0, by which the flip-flop $FF_4$ is reset resulting in the output $\overline{Q}$ at the level 1 and its output Q at the level 0 as shown in FIG. 19I.

Hence, the monostable multivibratory 107 is enabled to generate an output pulse, and the positive output from the monostable multivibrator 107, shown in FIG. 19F, is applied through the OR gate $G_8$ to the station select pulse generator 100 to stop the oscillation of the pulse generator during the delay time period $t_3$. Further, the output from the OR gate $G_8$ is applied through an OR gate $G_9$ to the terminal 35 to derive thereat an output depicted in FIG. 19G. When the output at the terminal 35 is 1, the transistor 34 in FIG. 5 is turned ON and, only at this time, the lamp switch of the display device 47 corresponding to the frequency readout from the memory device 29 or 30 (and represented by the content of the counter 18) is lighted. When the output from the monostable multivibrator 107 returns to 0 after the time period $t_3$, the station select pulse generator 100 is able to resume its oscillation to repeat the above operation.

If the read output from the memory device 29 or 30 remains at the level 1 as shown in FIG. 19D, there is the possibility that the monostable multivibrator 107 was not triggered. To eliminate such possibility, the AND gate $G_3$ is supplied with the memory read output from the terminal 36 and the output from the station select pulse generator 100 to provide an output such as shown in FIG. 19E, which is differentiated and by which the monostable multivibrator 107 is triggered.

If any one of the lighted lamp switches of the display device 47 is depressed, this is detected by the detector circuit 48 (refer to FIG. 4) and the output at the terminal 55 is switched from 1 to 0 as illustrated in FIG. 19H. Thus, the flip-flop $FF_2$ is reset to provide its output $\overline{Q}$ with 1 as shown in FIG. 19B. With this operation, the oscillation of the station select pulse generator 100 is stopped and the frequency corresponding to the depressed lamp switch is received and, at the same time, this lamp switch is lighted.

In the "SEARCH STOP" mode of operation described above, by initiating the "SEARCH" mode, all the receivable frequencies or programmed frequencies stored in the memory devices 29 or 30 are displayed on the panel display device 47 and then the receiver is turned to a desired one of these frequencies by depressing a corresponding lamp switch, and the selected frequency is received. Therefore, it might be said that the above operation mode is the most common one. In practice, however, where a desired receivable frequency is previously known or where a station signal level is not sufficiently high but it is desired to tune that station, it is preferable that the desired frequency can be received by depressing a lamp switch on the display device 47 corresponding thereto, but without necessitating a "SEARCH" mode of operation.

To this end, the outputs of the common contacts $M_0$ to $M_9$ provided in the panel display device 47 are employed. Namely, by depressing any one of the lamp switches on the panel display device 47, the terminals $C_1$ and $C_2$ are closed (FIGS. 10 and 15) to change the output to the terminal 97*a* from 1 to 0. The signal at the terminal 97*a* is applied to the AND gate $G_2$ through a chattering preventive circuit 108 and, by the output of 0 derived from the AND gate $G_2$, the flip-flop $FF_2$ is set, The flip-flop is thus conditioned to enable the performance of the same operation as that in the aforesaid "SEARCH" mode in which the button switch 91*a* is depressed. to thus light the associated lamp of the display device 47 the desired frequency and the corresponding parallel connected lamp switch is, of course, depressed, this is detected as described above as a detected output from the terminal 55 (refer to FIG. 19). In this case, however, the flip-flop $FF_4$ had been set in response to the signal supplied to terminal 97*a* and its output $\overline{Q}$ had been 0, so that the monostable multivibrator 107 did not operate regardless of the memory read out signals that might have been applied to terminal 36. The output Q of the flip-flop $FF_4$ is led to the terminal 35 through the OR gate $G_9$, thus enabling of the neon lamps of the panel display device 47 to be lighted. The reason why all the neon lamps are lighted is to enable the circuit 48 to detect the depression of a lamp switch. Thus, when the counter 10 is incremented to a count corresponding to the station associated with the depressed lamp switch, that lamp is lighted and a 0 is applied terminal 55. As described above in the "SEARCH STOP" mode, the flip-flop $FF_2$ is now reset to thereby supply the pulse generator 100 with a 1. The pulse generator is deactuated and the receiver remains tuned to the selected station. With the provision of the common contacts $M_0$ to $M_9$ in the display device 47, it is possible to receive any frequency only by depressing a corresponding lamp switch regardless of the content of the memory 29 or 30.

Now, the "NEXT" mode of operation in which the button switch 92(NEXT) is actuated will be described. In this mode of operation, the signal at the terminal 92*a* is switched from 1 to 0, which is then inverted into 1 by an inverter $I_6$, the output from which is differentiated and applied to the set terminal of a flip-flop $FF_3$ to set the flip-flop $FF_3$. Consequently, its output $\overline{Q}$ becomes 0 and the outputs from the AND gate $G_7$ and the OR gate $G_8$ become 0. As a result of this, the station select pulse generator 100 starts its oscillation to produce the station select pulses and the broadcast station sweeping operation is performed. When the read output from the memory device 29 or 30 through the terminal 36 becomes 1, the monostable multivibrator 107 is triggered and its negative output is supplied to an AND gate $G_6$. Accordingly, the output from the AND gate $G_6$ becomes 0, by which the flip-flop $FF_3$ is reset to alter its output $\overline{Q}$ to 1. Thus, a 1 is supplied to the station select pulse generator 100 via OR gate 68 and it stops oscillating to maintain the content of the counter 18 and enable the reception of the station that was read out of the memory device. Depressing the button switch 92 again enables the next frequency stored in the memory device 29 or 30 to be received.

In the above-described "SEARCH" mode and "NEXT" modes of operation and in the "START" mode of operation employing the common contacts of the panel display device 47, a signal of the level "1" is normally applied to the terminal 37*a* of the memory control circuit 38*a* or 38*b* to read the content of the memory device 29 or 30.

Turning now to FIG. 20, a description will be given of the "IN" mode of operation in which a desired frequency is written the memory device 30 by actuating the button switch 95 (IN). The button switch 95 is depressed when a desired frequency to be written in the memory device 30 is being received. When this switch is operated, the output at the terminal 95*a* is changed from 1 to 0 as depicted in FIG. 29A. The output at the terminal 95*a* is differentiated and supplied to the set terminal of the flip-flop $FF_1$ and, at the same time, to an inverter $I_1$. Consequently, the flip-flop $FF_1$ is set at the fall of the differentiated signal applied thereto and the output Q of the flip-flop $Ff_1$ becomes 1 as shown in FIG. 20B. The output $\overline{Q}$ (0) of the flip-flop $FF_1$ is applied to the terminal 37*b* of the memory control circuit 38*b*, by which the memory device 30 is put in its operative condition but the memory device 29 is made in operative. Further, the inverter $I_1$ produces an output depicted in FIG. 20C, which is applied to an AND gate $G_1$ and then differentiated. A differentiated pulse shown in FIG. 20D is fed to an inverter $I_2$ to produce an output of the level 0 depicted in FIG. 20E. The output from the inverter $I_2$ is applied to the terminal 37*a* of the memory control circuit 38*b*, thus writing in the memory device 30 a representation of the frequency being received. Further, the output from the inverter $I_2$ is differentiated to provide a differentiated pulse shown in FIG. 20F, which is supplied to an inverter $I_5$ to derive therefrom an output 0 illustrated in FIG. 20G. The output thus derived from the inverter $I_5$ is applied to the set terminal of the flip-flop $FF_2$ to set the flip-flop $FF_2$, and hence to change its output $\overline{Q}$ to 0 as depicted in FIG. 20H. With the output $\overline{Q}$ of the flip-flop $FF_2$ providing 0, the station select pulse generator 100 starts its oscillation to bring about the aforesaid "SEARCH" mode of operation and the frequency written in the memory device 30 is displayed on the panel display device 47 when the counter 18 is incremented so that its content corresponds to the stored frequency.

The AND gate $G_1$ is provided to prevent the initiation of the "IN" mode of operation if the button switch 95 is depressed while the receiver is in the "SEARCH" mode of operation output $\overline{Q}$ of the flip-flop $FF_2$ is 0 during the "SEARCH" mode and thus disables the AND gate $G_1$.

If desired, the muting circuit 4 depicted in FIG. 1 may be provided at the output of the multiplex circuit 5.

It will be apparent that many modifications and variations may be effected without departing from the scope of the novel concepts of this invention.

I claim as my invention:

1. A broadcast receiver comprising:

a. a front end having a variable local oscillator for generating a local frequency signal:

b. a programmable divider coupled to said front end and including dividing means and a counter, said dividing means operating to divide the frequency of said local frequency signal by a factor determined by contents of said counter;

c. pulse generator means for producing pulses for changing the content of said counter;

d. a comparator for comparing the divided local frequency signal derived from said programmable divider with a reference signal to produce a control signal for determining the frequency of said local frequency signal generated by said variable local oscillator;

e. means coupled to said front end for converting the output signal produced by said front end to a low frequency signal and to transmit said low frequency signal to output means;

f. a muting circuit connected to said last-mentioned means for selectively inhibiting the transmission of said low frequency signal to said output means; and g. muting circuit control means activated when the content of said counter is changed for actuating said muting circuit to inhibit said transmission of said low frequency signal, and for sensing when said counter content is not changed for deactuating said muting circuit to enable the transmission of said low frequency signal to said output means.

2. A broadcast receiver according to claim 1 wherein said muting circuit control means is coupled to said pulse generator means for producing a muting signal having a duration that is a function of the number of pulses received from said pulse generator means.

3. A broadcast receiver according to claim 2 wherein said muting circuit control means includes time delay means for producing said muting signal with a time duration longer than the time interval during which said pulses are received from said pulse generator.

4. A broadcast receiver comprising:

a. a tuner having a variable local oscillator for generating a local frequency signal tuneable to a selected broadcast frequency;

b. a programable frequency divider coupled to said tuner and including dividing means and a counter, said dividing means operating to divide the frequency of said local frequency signal in response to the contents of said counter, said contents representing broadcast frequencies;

c. pulse generator means for generating pulses to change the contents of said counter;

d. a comparator for comparing the divided local frequency signal derived from said programable divider with a reference signal to produce a control signal for determining the frequency of said local frequency signal, said frequency being established in accordance with the contents of said counter;

e. first memory means comprised of a plurality of memory elements for storing selected signals therein representing broadcast frequencies, each stored signal being derived from the contents of said counter;

f. read-out means for selectively reading out the signals stored in said first memory means and for controlling said pulse generator means in accordance with said read out signal;

g. second memory means comprised of a plurality of non-voltaic memory elements for selectively storing the content of said counter; and h. memory control means coupled to said second memory means for writing into said second memory means the content of said counter and for reading out the signals stored in said second memory means to preset said counter with the read out signal.

5. A broadcast receiver according to claim 4 wherein said memory control means includes means for altering the signals stored in said second memory means.

6. A broadcast receiver according to claim 4 further including visual display means having a plurality of visual display elements each being energized in accordance with said contents of said counter to provide a visual indication of the frequencies to which said tuner is tuned, and a plurality of selecting switches associated with said display elements for enabling said broadcast receiver to receive and detect selected broadcast frequencies as determined by the operation of said switches.

7. A broadcast receiver according to claim 4 further including means coupled to said tuner for converting the output signal produced by said tuner to a low frequency signal and to transmit said low frequency signal to output means, a muting circuit connected in the transmission path of said low frequency output signal, and means for controlling said muting circuit in accordance with the change in content of said counter such that when the content of said counter is changed in response to said pulses generated by said pulse generator means, said muting circuit is operated to inhibit the transmission of said low frequency output signal to said output means.

8. A broadcast receiver according to claim 7, wherein said means for controlling said muting circuit includes a circuit for producing a muting control signal, said muting control signal being applied to said memory control means for initiating a write operation whereby the content of said counter is written into said second memory means.

9. A broadcast receiver according to claim 7, wherein said means for controlling said muting circuit includes a circuit for producing a pulse waveform having a duration dependent upon the number of pulses generated by said pulse generator means.

10. A broadcast receiver according to claim 9, wherein said means for controlling said muting circuit further includes time delay means for producing said pulse waveform with a time duration longer than the interval during which said number of pulses is generated by said pulse generator means.

11. A broadcast receiver adapted to be tuned to any of a plurality of broadcast frequencies to receive and detect a broadcast signal and to recover information therefrom, comprising:

tuning means for tuning said broadcast receiver to a broadcast frequency, said tuning means including a counter, the content of which is representative of a broadcast frequency; a variable local oscillator for generating a local oscillating signal of variable frequency; and programmable dividing means for dividing the frequency of said local oscillating signal by a selected dividing ratio, the dividing ratio being selected in accordance with the content of said counter; said local oscillator and said programmable dividing means being included in a phase-locked loop so that the frequency of said local oscillating signal is adjusted to enable the reception of the broadcast frequency determined by the content of said counter;

pulse generating means for supplying pulses to said counter to change the content of said counter in response to each supplied pulse, the operation of said pulse generating means being interrupted when said broadcast receiver attains one of a plurality of predetermined conditions;

a plurality of manually actuable switch means, each corresponding to a broadcast frequency;

switch detecting means for detecting the actuation of a switch means for enabling said pulse generating means to change the content of said counter and for preventing the content of said counter from changing when said content represents the broadcast frequency corresponding to said actuated switch means;

information recovering means coupled to said tuning means for recovering a low frequency information signal from the broadcast signal to which said receiver is tuned and for transmitting said low frequency information signal to output means;

signal muting means coupled to said information recovering means for selectively inhibiting the transmission of said low frequency information signal to said output means when the content of said counter is changed, and for enabling said transmission when the content of said counter is not changed; and memory means coupled to said counter for storing the content thereof after said content has been changed in response to said pulses applied thereto and for presetting said counter to said content stored in said memory means when said broadcast receiver is resupplied with operating power.

12. A broadcast receiver in accordance with claim 11 wherein said signal muting means comprises:

selective conducting means responsive to a muting control signal applied thereto for inhibiting the transmission of a signal thereby, and responsive to the absence of a muting control signal for transmitting a signal; and muting control signal generating means coupled to said pulse generating means for generating a muting control signal having a duration extending at least throughout the interval that said pulse generating means operates to supply pulses to said counter.

13. A broadcast receiver in accordance with claim 12 wherein said muting control signal generating means comprises:

level changing means responsive to a pulse generated by said pulse generating means for changing the level of an output signal produced thereby from a first to a second level;

sawtooth signal generating means responsive to each pulse generated by said pulse generating means for producing a sawtooth signal having an amplitude proportional to the width of said pulse; and threshold means for sensing when the amplitude of said sawtooth signal exceeds a threshold level for activating said level changing means to change the level of said output signal produced thereby from said second level to said first level.

14. A broadcast receiver in accordance with claim 11 wherein said memory means is comprised of a plurality of non-voltaic storage elements and further includes write enable means coupled to said pulse generating means for producing a write enable signal of predetermined duration to enable the content of said counter to be transferred to said non-voltaic storage elements at a time after the operation of said pulse generating means is interrupted.

15. A broadcast receiver in accordance with claim 14 wherein said write enable means comprises:

sawtooth signal generating means responsive to each pulse generated by said pulse generating means for producing a sawtooth signal having an amplitude proportional to the width of said pulse; and threshold means for sensing when the amplitude of said sawtooth signal exceeds a threshold level for producing an output pulse of predetermined duration.

* * * * *